United States Patent [19]

Ichikawa et al.

[11] Patent Number: 5,283,657
[45] Date of Patent: Feb. 1, 1994

[54] RECORDING DEVICE FOR RECORDING A HALF-TONE IMAGE USING A PLURALITY OF RECORDING ELEMENTS FOR THE SAME COLOR

[75] Inventors: Hiroyuki Ichikawa, Tokyo; Nobuyuki Watanabe, Yokohama, both of Japan

[73] Assignee: Canon Kabushiki Kaisha, Tokyo, Japan

[21] Appl. No.: 703,152

[22] Filed: May 20, 1991

Related U.S. Application Data

[62] Division of Ser. No. 271,299, Nov. 15, 1988, Pat. No. 5,038,208.

[30] Foreign Application Priority Data

Nov. 16, 1987 [JP] Japan .................. 62-289190
Jul. 28, 1988 [JP] Japan .................. 63-189713

[51] Int. Cl.$^5$ ................... H04N 1/21; H04N 1/387
[52] U.S. Cl. ......................... 358/296; 358/518; 358/524
[58] Field of Search ................ 358/296, 80, 78; 346/1.1

[56] References Cited

U.S. PATENT DOCUMENTS

| | | | |
|---|---|---|---|
| 4,394,693 | 7/1983 | Shirley | 358/298 |
| 4,463,359 | 7/1984 | Ayata et al. | 346/1.1 |
| 4,533,928 | 8/1985 | Sugiura et al. | 346/140 |
| 4,540,991 | 9/1985 | Kariya et al. | 346/76 |
| 4,595,948 | 6/1986 | Itoh et al. | 358/75 |
| 4,713,701 | 12/1987 | Kawamura et al. | 358/298 |
| 4,713,746 | 12/1987 | Watanabe et al. | 346/1.1 |
| 4,723,129 | 2/1988 | Endo et al. | 346/1.1 |
| 4,800,442 | 1/1989 | Riseman et al. | 358/298 X |
| 4,853,768 | 8/1989 | Suzuki et al. | 358/80 |
| 4,876,612 | 10/1989 | Honma et al. | 358/474 |
| 4,907,013 | 3/1990 | Hubbard et al. | 346/1.1 |
| 5,020,118 | 5/1991 | Sugiura | 382/50 |

FOREIGN PATENT DOCUMENTS

| | | |
|---|---|---|
| 3315507 | 11/1983 | Fed. Rep. of Germany . |
| 54-59936 | 5/1979 | Japan . |
| 57-54470 | 3/1982 | Japan . |
| 57-54473 | 3/1982 | Japan . |
| 54473 | 3/1982 | Japan . |
| 2154776 | 9/1985 | United Kingdom . |

Primary Examiner—Benjamin R. Fuller
Assistant Examiner—Eric Frahm
Attorney, Agent, or Firm—Fitzpatrick, Cella, Harper & Scinto

[57] ABSTRACT

An image recording apparatus comprising a plurality of multi-nozzle heads for forming an image according to input image forming signals, a memory means for storing data corresponding to image forming characteristics of each of the multi-nozzle heads, and a corrector means for correcting the image forming signals based on the data stored in the memory means.

13 Claims, 18 Drawing Sheets

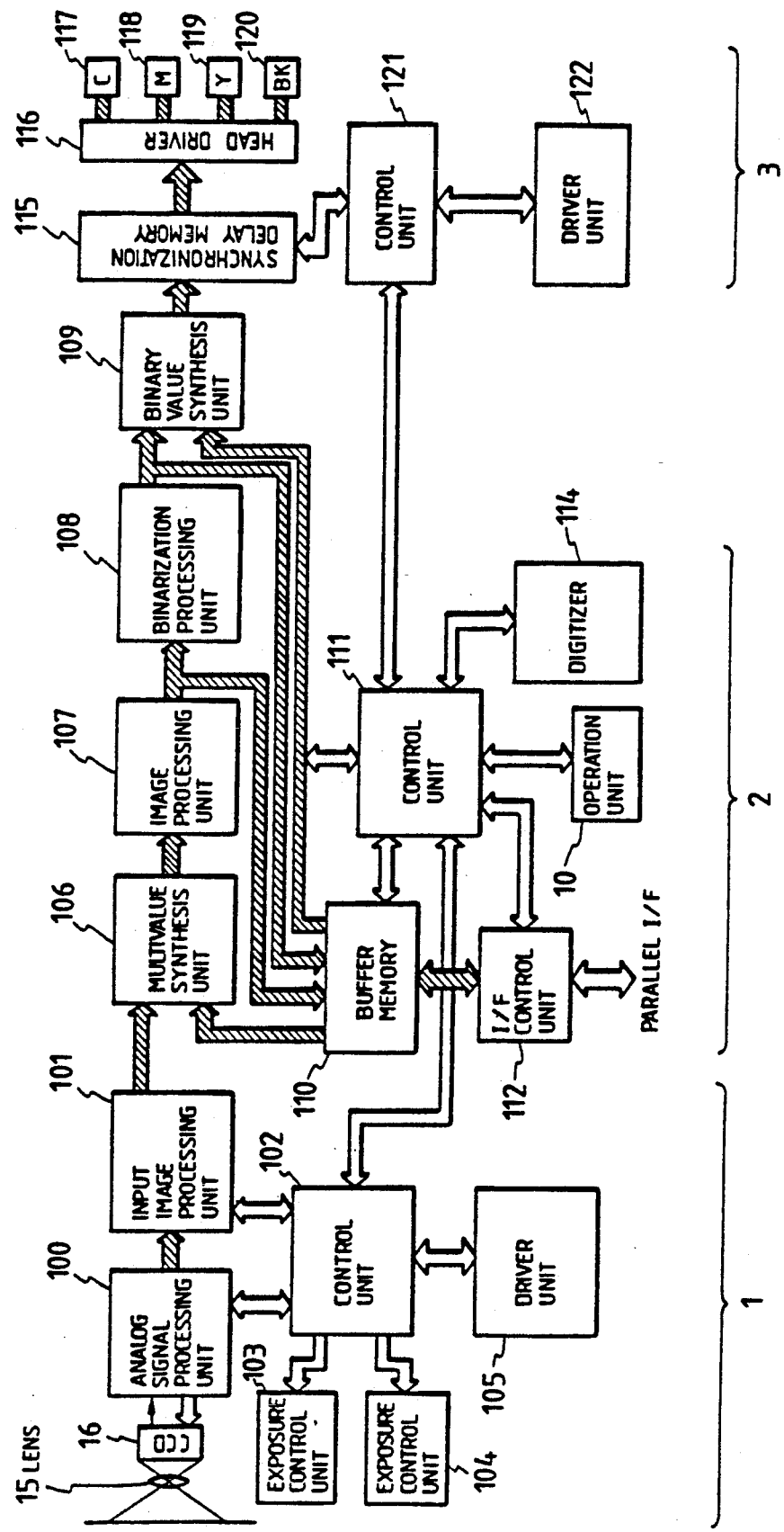

FIG. 12
OBJECT PIXEL DATA 
SMOOTHED SIGNAL 
EDGE SIGNAL 
SIGNAL AFTER EDGE EMPHASIS 
FIG. 13
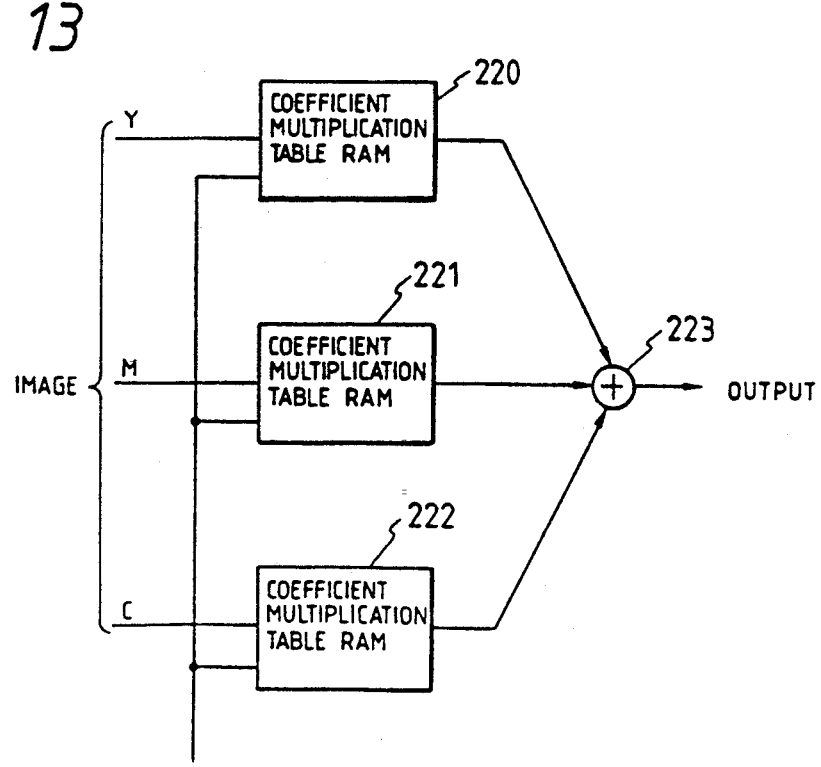

RECORDING DEVICE FOR RECORDING A HALF-TONE IMAGE USING A PLURALITY OF RECORDING ELEMENTS FOR THE SAME COLOR

This application is a division of application Ser. No. 07/271,299 filed Nov. 15, 1988 U.S. Pat. No. 5,038,208.

BACKGROUND OF THE INVENTION

1. Field of the Invention

The present invention relates to an image recording apparatus, and more particularly to a color image recording apparatus for forming a color image by using multi-nozzle heads.

2. Related Background Art

Conventionally, in a digital color copying machine using a plurality of multi-nozzle heads, data as to each of three primary colors, i.e. red, green and blue, are read out and then the read-out image data are converted into digital signals, whereupon the data of the digital signals are processed to form an image by using the multi-nozzle heads.

However, this multi-head color copying machine was sometimes encountered with non-uniform density of the output image due to the widely variable characteristics such as of the manufacturing process of the heads and/or of component materials of the heads.

SUMMARY OF THE INVENTION

It is therefore a primary object of the present invention to provide an image recording apparatus with which it is possible to minimize non-uniform density of an output image.

Another object of the invention is to provide an image recording apparatus with which it is possible to minimize any undesired effect to an output image by widely variable characteristics such as of the manufacturing process of a multiplicity of heads and/or of component materials of the heads.

A further object of the invention is to provide an image recording apparatus with which it is possible to restrict non-uniformity of density of an output image, irrespective of the manner of using a multiplicity of heads.

A still further object of the invention is to provide a full-color image recording apparatus with which it is possible to reduce non-uniformity of density of an output image.

According to the present invention, there is provided an image recording apparatus comprising a plurality of multi-nozzle heads for forming an image according to input image forming signals, a memory means for storing data corresponding to image forming characteristics of each of the multi-nozzle heads, and a corrector means for correcting the image forming signals based on the data stored in the memory means.

Many other advantages, features and additional objects of the present invention will become manifest to those versed in the art upon making reference to the detailed description and the accompanying sheets of drawings in which certain embodiments incorporating the principle of the present invention are shown by way of illustrative example.

BRIEF DESCRIPTION OF THE DRAWINGS

FIG. 9 is a block diagram of the color copying machine;

FIG. 12 is a timing chart between smoothing and edge emphasis processing;

FIG. 13 is a detail circuit diagram of a masking unit;

DETAILED DESCRIPTION OF THE PREFERRED EMBODIMENT

Figure 1:
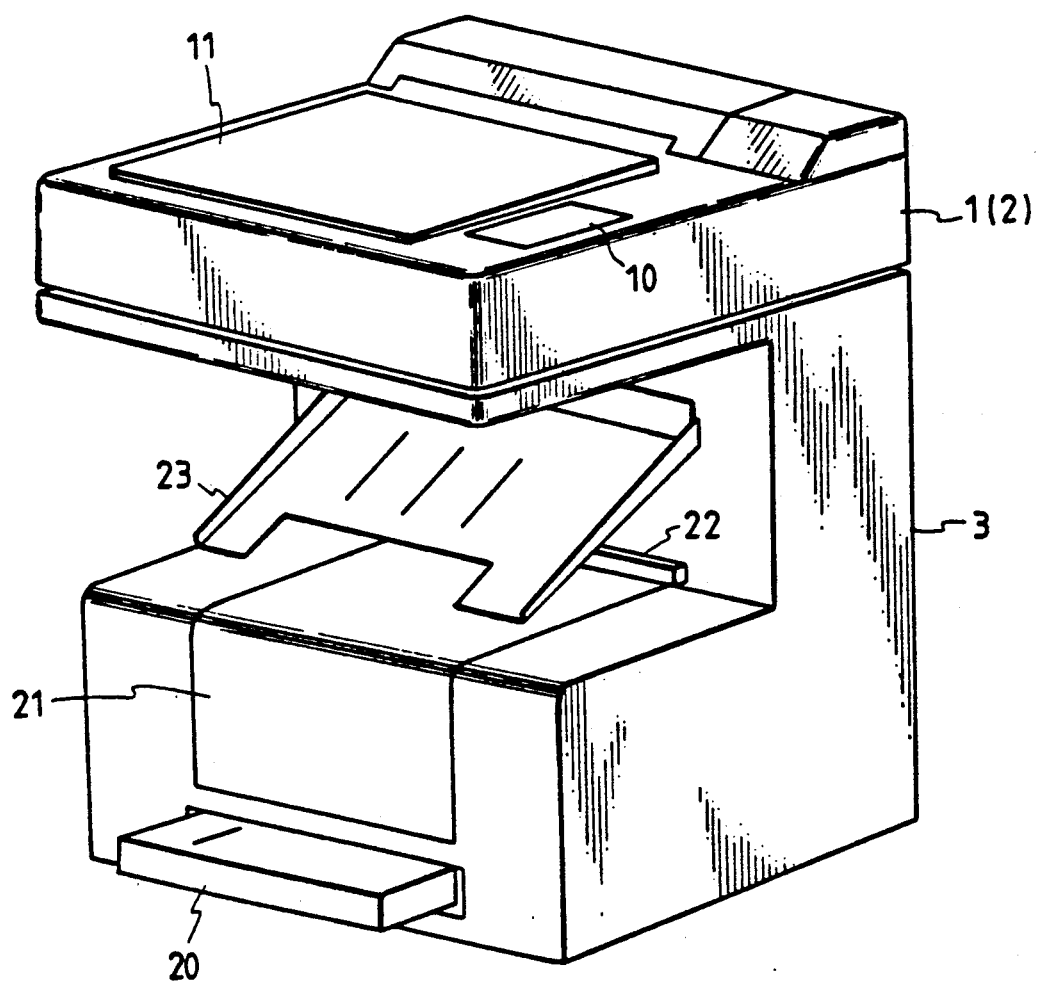
FIG. 1 is a perspective view of a digital color copying machine incorporating an image recording apparatus embodying the present invention.
Figure 2:
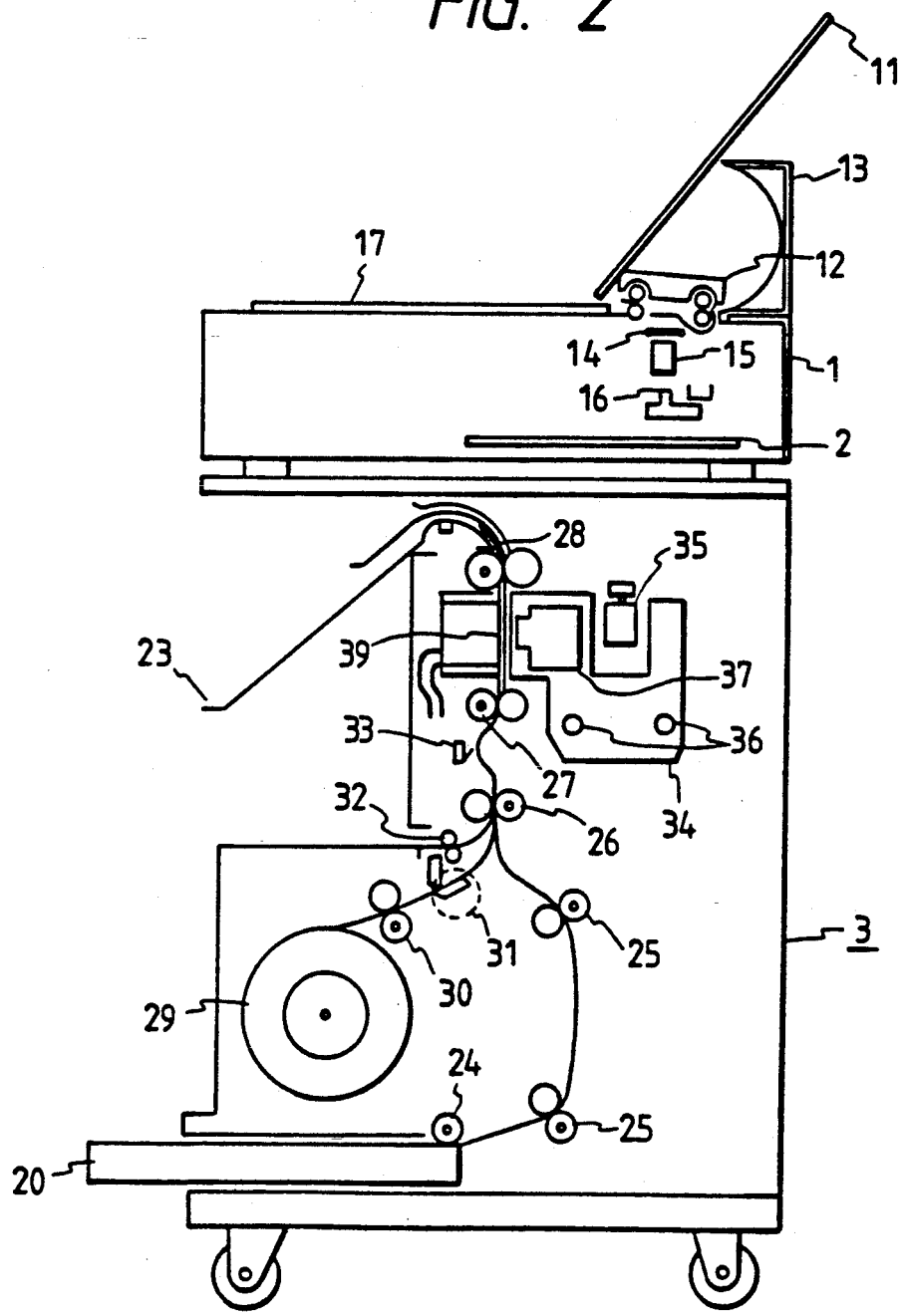
FIG. 2 is a side elevational view, with parts broken away, of the copying machine of FIG. 1.

The principle of the present invention is particularly useful when embodied in an image recording apparatus incorporated in a digital color copying machine such as shown in FIGS. 1 and 2.

As shown in FIG. 1, the upper part of the copying machine is chiefly composed two stations: a color image scanner (hereinafter called "scanner") 1 for reading out an image of an original and for outputting digital color image data, and a controller 2 for performing various image-processes of digital color image data stored in the scanner 1 and also for performing other processes such as interfacing with an external apparatus.

The scanner 1 also has built-in mechanism for reading out an original in a solid or sheet form placed under an original holder 11 with its front side down. The readout mechanism also reads out a large-sized sheet original.

Designated by 10 is an operation unit connected to the controller station 1 for inputting to the controller 1 various information required for image-copying. The controller 2 sends to the scanner 1 and a printer 3 (described below) instructions regarding respective operation according to the input information. Further, if it is necessary to process the input information with sophisticated editings, a digitizer, for example, may be substituted for the original holder 11 and connected to the controller 1.

The lower part of the copying machine is the printer 3 for recording on a recording paper a color digital image signal outputted from the controller station 2. In the illustrated embodiment, the printer 3 is a full-color ink-jet printer using a so-called ink-jet-type recording head, which is disclosed in Japanese Patent Laid-Open No. 54-59936 Gazette.

The above-controller and printer may be separated from each other, whereupon the separated controller and printer are connected with each other by using a connecting cable.

Printer Unit

The general mode of operation of the copying machine will now be described with reference to FIG. 2.

First of all, an image on the original placed on an original support pane 17, an image projected by a projector, or an image on a sheet original carried by a sheet feed mechanism 12 is read out by an exposure lamp 14, a lens 15 and an image sensor 16 (charge-coupled device, i.e., CCD in the illustrated embodiment) capable of reading out a line image in full color. Then the readout image information is processed by the scanner 1 and the controller 2 with various image processings, whereupon the resulting image is recorded on a recording paper by the printer 3.

The recording paper is supplied from a stack of regular-size sheets (A4 size and A3 size in the illustrated embodiment) contained in a sheet cassette 20 or is drawn from a roll of paper 29 for large-size recording (A2 size and A1 size in the illustrated embodiment).

Designated by 22 in FIG. 1 is a hand insertion port 22 through which recording paper sheets may be manually inserted one at a time along a cover 21.

A pick-up roller 24 is disposed at one end of the sheet cassette 20 for paying out recording paper sheets one at a time, and the individual paid-out recording paper sheet is then fed to a first delivery roller 26 by feed rollers 25, 25.

The roll paper 29 is paid out by a feed roller 30 and is severed a predetermined length by a cutter 31, and the severed length of paper is then fed to the first delivery roller 26.

The pick-up roller 24, the feed rollers 25, 25, the feed roller 30, the first delivery roller 26 and a hand insertion roller 32 are driven by a non-illustrated paper-feed motor (a DC servomotor is used in the illustrated embodiment); energization and deenergization of each of these rollers are controlled by an electromagnetic clutch associated with the respective roller.

As the printing operation is initiated upon receipt of instructions from the controller 2, a recording paper supplied from a selected one of the above-mentioned paper-feed paths is conveyed to the first delivery roller 26. In order to eliminate a slant or skew of the recording paper, a predetermined amount of loop of the recording paper is formed, whereupon the first delivery roller 26 is energized to feed the recording paper to a second delivery roller 27.

Further, the recording paper is slackened to a predetermined amount to provide a buffer between the first and second delivery rollers 26, 27 so that the recording paper can be fed accurately between the second delivery roller 27 and a feed roller 28. Designated by 33 is a sensor for detecting the amount of a buffer. By normally forming a buffer during the feeding of the recording paper, it is possible to reduce the amount of a load exerted on the feed roller 28 and the second delivery roller 27 especially if the recording paper is large-sized, thus enabling accurate feeding of the recording paper.

In making a print by recording heads 37, a scanning carriage 34 to which the recording heads 37 are mounted is moved forwardly and backwardly on and along a carriage rail 36 as driven by a scanning motor 35, thus making forward and backward scanning. In the forward scanning an image is printed on the recording paper, and in the backward scanning the recording paper is fed to a predetermined extent by the feed roller 28. During that time, the non-illustrated paper-feed motor serves to control the above-discussed drive system as the sensor 33 detects the amount of a buffer so as to normally keep the latter constant.

The printed recording paper is discharged onto a discharge tray 23; thus a cycle of printing operation has been completed.

The scanning carriage 34 and its associated parts will now be described in detail with reference to FIG. 3.

Figure 3:
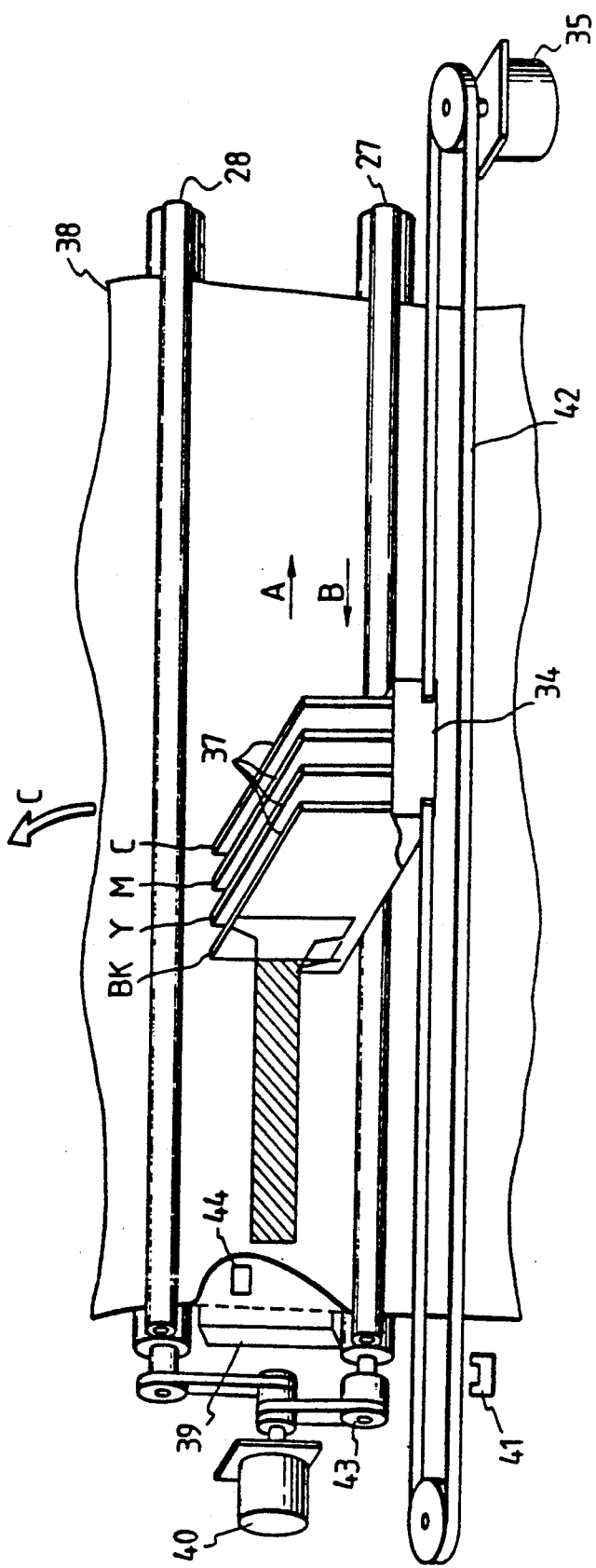
FIG. 3 is a perspective detail view of a scanning carriage and its related parts.

In FIG. 3, designated by 40 is a paper-feed motor for driving the second delivery roller 27 via a clutch 43 and the feed roller 28 and a clutch 43 to intermittently feed the recording paper.

The scanning motor 35 is a drive source for driving the scanning carriage 34 via a belt 42 to scan in the directions of arrows A, B. In the illustrated embodiment, a pulse motor is used for each of the paper-feed motor 40 and the scanning motor 35 in order to control the feeding of the recording paper accurately.

When the recording paper arrives at the second delivery roller 27, both the clutch 43 and the paper-feed motor 40 are energized to feed the recording paper on a platen 39.

The recording paper is detected by a sensor 44 mounted on a platen 39; such data or information from this sensor 44 is utilized for e.g. positioning the recording paper correctly and preventing the recording paper from getting jammed.

When the recording paper arrives then at the feed roller 28, both the clutch 43 and the paper-feed motor 40 are deenergized and, at the same time, a suction is made from the inside of the platen 39 by a non-illustrated suction motor to bring the recording paper in contact with the circumferential surface of the platen 39.

Prior to the image recording operation, the scanning carriage 34 is moved to a home-position sensor 41. Then the scanning carriage 34 makes a forward scanning in the direction of arrow A, during which time cyan, magenta, yellow and black inks are ejected from the specified positions of the recording heads 37. Upon completion of image recording of a predetermined length, the scanning carriage 34 is stopped and then makes a backward scanning in the direction of arrow B until the carriage 34 returns to the home-position sensor 41. During the backward scanning, the recording paper is fed in the direction of an arrow C by the printed length as the feed roller 28 is driven by the paper-feed motor 40.

In the illustrated embodiment, the recording head 37 comprises four ink-jet nozzle assemblies each assembly being composed 256 nozzles; ink drops are ejected by the pressure of bubbles created by heat.

As the scanning carriage 34 is stopped at its home position detected by the home-position sensor 41, the recording head 37 recovers its initial state. This is necessary to accomplish an uniform and reliable recording operation; specifically, in order to prevent non-uniform recording at the start of ink-ejection due to e.g. the varying viscosity of ink left in the nozzles of the recording heads 37, the recording head 37 is pressurized to make an empty-ejection to thereby clear any residual ink in the nozzles under programmed conditions that various critical data and functions such as paper-feed time, interior temperature and ejection time are preset.

The foregoing procedures are repeated until the entire image of the original are recorded on the recording paper.

Second Unit

The mode of operation of the scanner 1 will now be described in detail with reference to FIGS. 4 and 5.

Figure 4:
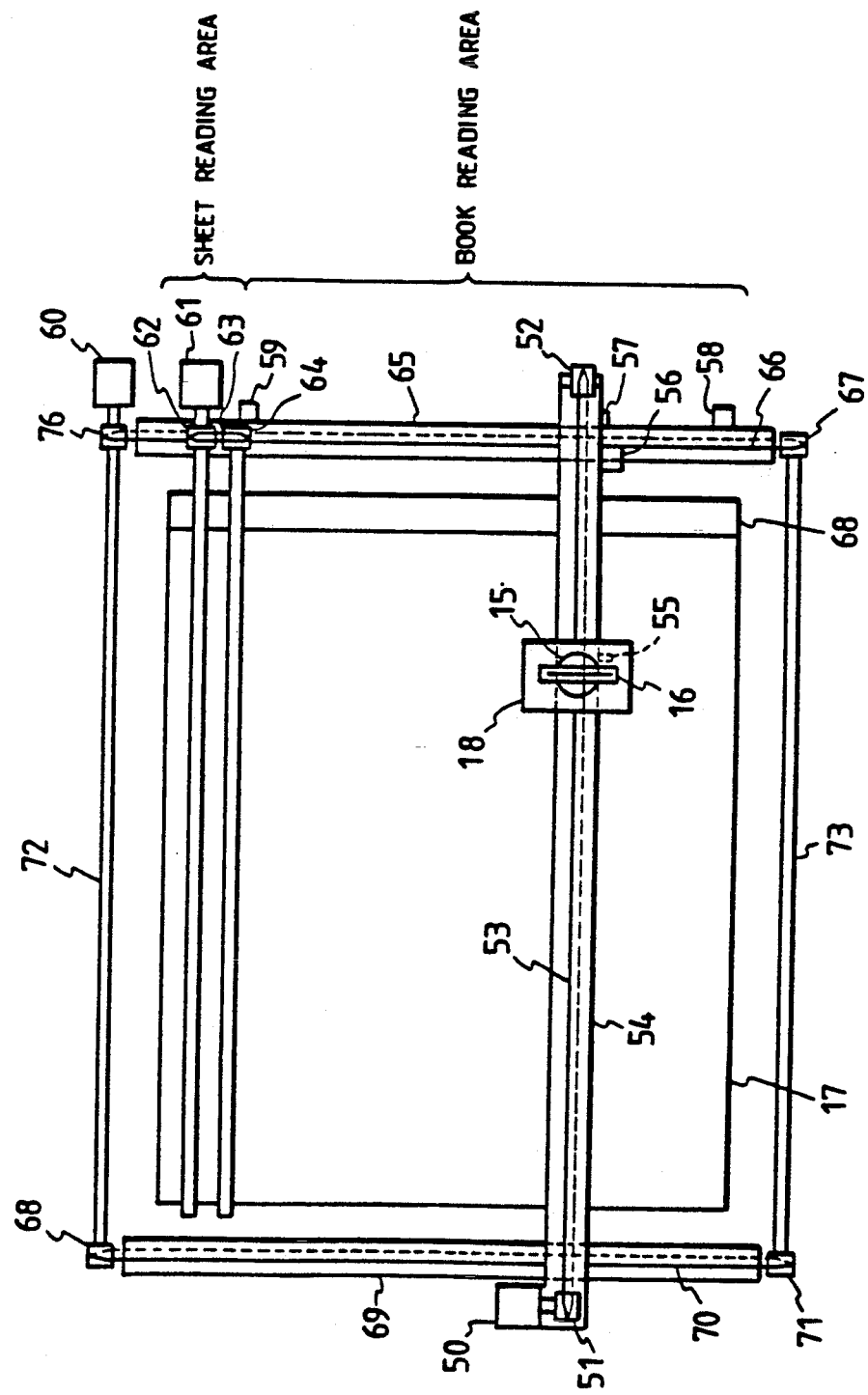
FIG. 4 is a detail plan view of an interior mechanism of a scanner.

FIG. 4 shows the interior mechanism of the scanner 1. A charge-coupled device (CCD) unit 18 comprises a CCD 16 and a lens 15 and is movable on and along a rail 54, as driven by a main drive system of main scanning direction, to read out an image of the original on the original support pane 17 in the main scanning direction. The main drive system includes a main scanning motor 50 fixedly mounted on the rail 54, a pair of pulleys 51, 52 and a wire 53 wound around the pulleys 51, 52 and connected to the CCD unit 18. A shielding plate 55 and a home-position sensor 56 jointly serve to control the positioning of the CCD unit 18 as the latter is moved to the home position of the main scanning disposed at a correction area 68.

The rail 54 is supported on a pair of parallel auxiliary rails 65, 69 extending perpendicularly to the rail 54, and is movable in the sub-scanning direction as driven by an auxiliary drive system including a sub-scanning motor 60, two pairs of pulleys 67, 76 and 68, 71, a pair of parallel shafts 72, 73 and a pair of wires 66, 70 wound one around each pair of pulleys 67, 76 and 68, 71. A shielding plate 57 and a pair of home-position sensors 58, 59 jointly serve to control the positioning of the rail 54 as the latter is moved to the home position of the sub-scanning either in a book mode in which the original to be read out is a book placed on the original support pane 17 or in a sheet mode in which the original to be read out is a sheet.

A sheet-feed motor 61, a pair of sheet-feed rollers 74, 75, a pair of pulleys 62, 64 and a wire 63 jointly serve as a sheet-feed mechanism to feed the original in the form of a sheet. This sheet-feed mechanism is disposed on the original support pane 17 for intermittently feeding the sheet original, placed on the original support pane 17 with its front side (image side) down, by predetermined degrees.

Figure 5:
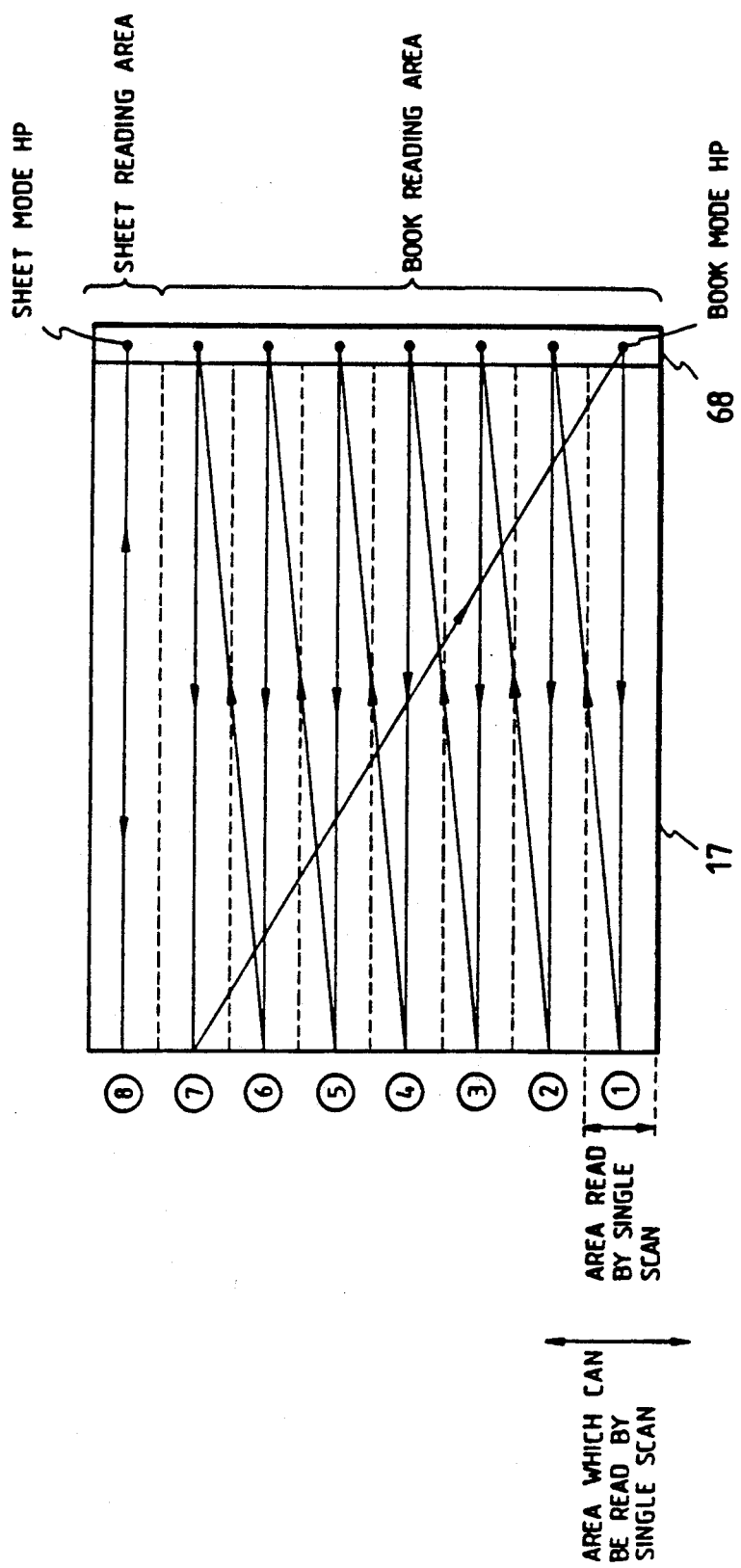
FIG. 5 is a detail plan view of an original support pane, illustrating the manner in which the original is to be read out for the book mode and the sheet mode.

FIG. 5 illustrates the manner in which the original is read out in each of the book mode and the sheet mode.

In the book mode, the CCD unit 18 is moved to a book mode home position (book mode HP) disposed in the correction area 68 of FIG. 5, from which position the CCD unit 18 starts to read out the entire image of the original placed on the original support pane 17.

Prior to the scanning of the original, in the correction area 68, necessary data for processing shading correction; black level correction, color correction, etc. are set, whereupon scanning is initiated in the main scanning direction, i.e. in the direction of arrows by the main scanning motor 50. When the reading out of the area ① has been completed, the main scanning motor 50 is rotated reversely and, at the same time, the sub-scanning motor 60 is energized to rotate so as to move the CCD unit 18 in the sub-scanning direction to the area ② of the correction area 68. Subsequently, the scanning of the area ②, like the main scanning of the area ①, is made after having made various processings such as shading correction, black level correction and color correction, according to need.

The foregoing scanning is repeated to read out all of the areas ①-⑦, and after the reading of the area ⑦ has been completed, the CCD unit 18 is returned to the book mode home position.

Practically, in reading out the original of A2 size at maximum, it is necessary to make many more number of scans; however, in the illustrated embodiment, the original is read out by only seven scans for clarity.

In the sheet mode, the CCD unit 18 is moved to a sheet mode home position (sheet mode HP) of FIG. 5, the area ⑧ is repeatedly read out, as the sheet original is intermittently moved by the sheet-feed motor 61, until the entire surface of the sheet original has been read out.

Prior to the scanning of the original, various processings, such as shading correction, black level correction and color correction, are made, whereupon the scanning in the main scanning direction is made in the direction of arrows. Upon completion of forward scanning or reading of the area 8, the main scanning motor 50 is rotated reversely, and during the backward scanning, the sheet-feed motor 61 is energized to rotate so as to move the sheet original by a predetermined length in the sub-scanning direction. The same scanning is repeated until the entire surface of the sheet original is read out.

Assuming that the foregoing reading is illustrated in equimultiple scale, the area read out by the CCD unit 18 is actually large as shown in FIG. 5. This is because the digital color copying machine of the illustrated embodiment has a built-in means for magnifying and reducing functions. In other words, since the region which can be recorded by the recording head 37 is fixed to 256 bits at a time, the image information of the region of 512 bits (twice 256 bits) at minimum is necessary if reduction by 50% is to be made, for example. Therefore, the scanner 1 has a built-in means for reading out the image information of any image region by a single main scan and for outputting such read-out information.

Film Projecting System

The scanner 1 of the illustrated embodiment may be provided with a projecting and exposing means for projection of a film.

Figure 6:
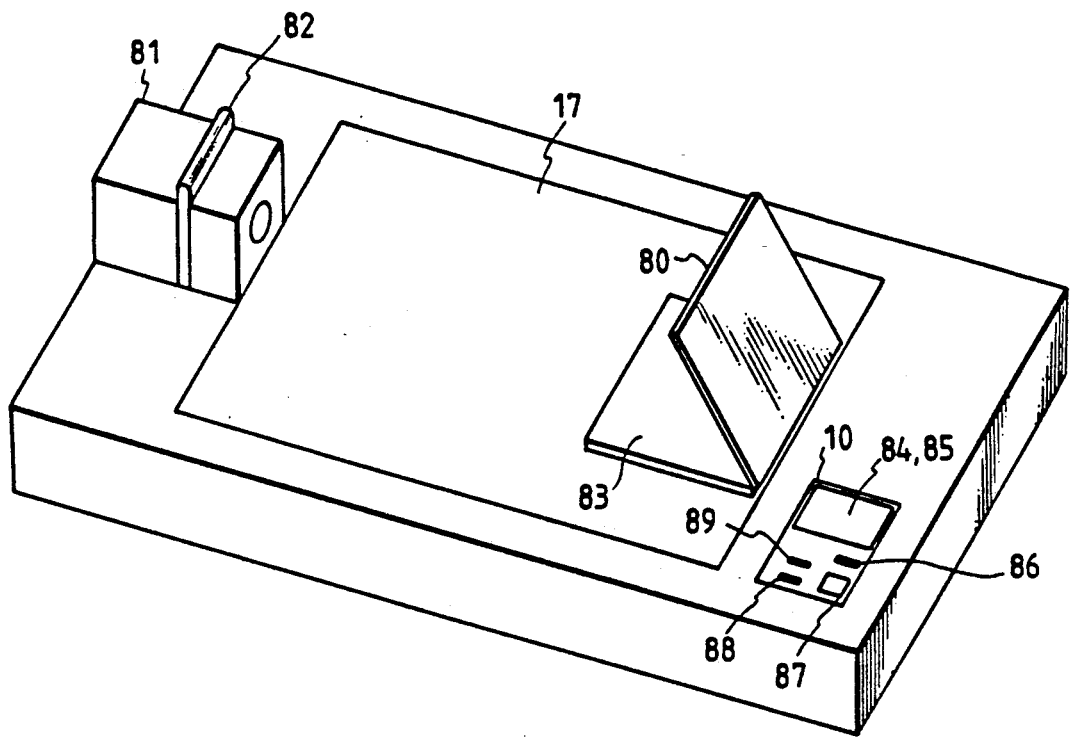
FIG. 6 is a perspective detail view of the scanner, showing the scanner to which a projector as a projecting and exposing means, and a detector mirror are attached.

FIG. 6 illustrates the scanner 1 having provided with the projecting and exposing means, which includes a projector unit 81 and a reflector mirror 80.

The projector unit 81 comprises a projector for projecting a negative and a positive film held by a film holder 82 and mounted in the projector unit 81. The image projected from the projector unit 81 is reflected by the reflector mirror 80 and reaches a Fresnel lens 83. The Fresnel lens 83 converts this image into parallel light to form an image on the original support pane 17.

Thus since the negative or positive film image is formed on the original support pane 17 by the projector unit 81, the reflector mirror 80 and the Fresnel lens 83, the formed image can be read out by the CCD unit 18, like the reading of the reflected original image.

Figure 7:
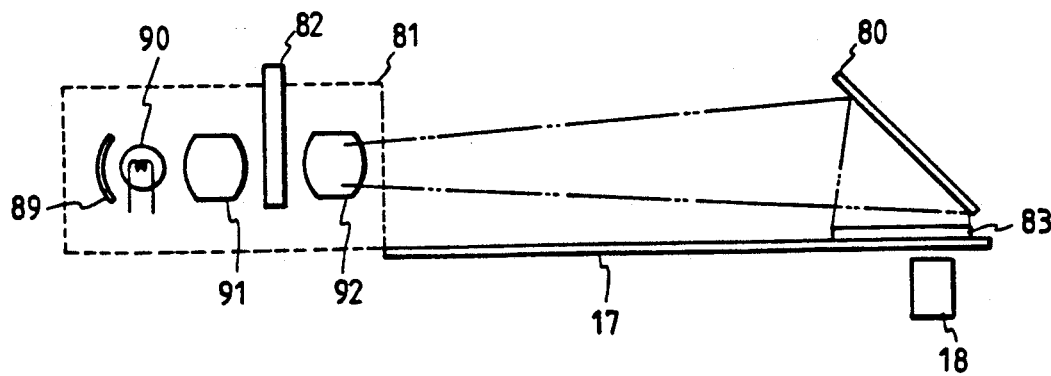
FIG. 7 is a detail view of a film projecting system.

This film projecting system will now be described more in detail with reference to FIG. 7.

The projector unit 81 is composed of a halogen lamp 90, a reflector 89, a condenser lens 91, the film holder 82 and a projector lens 92. Both straight light emitted from the halogen lamp 90 and light reflected by the reflector 89 are focused by the condenser lens 91 to reach an aperture in the film holder 82. The aperture of the film holder 82 is slightly larger than a single frame of the negative or positive film so that the film frame can be mounted in the projector unit 81 with sufficent allowance.

As the projected light reaches the aperture of the film holder 82 and passes through the film held by the film holder 82, a projected image of the film is obtained. This projected image is magnified optically by the projector lens 92 and is then oriented by the reflector mirror 80, whereupon the resulting image is converted into an image of parallel light by the Fresnel lens 83.

This image of parallel light is read out in the above-discussed book mode and is then converted into video signals.

Figure 8:
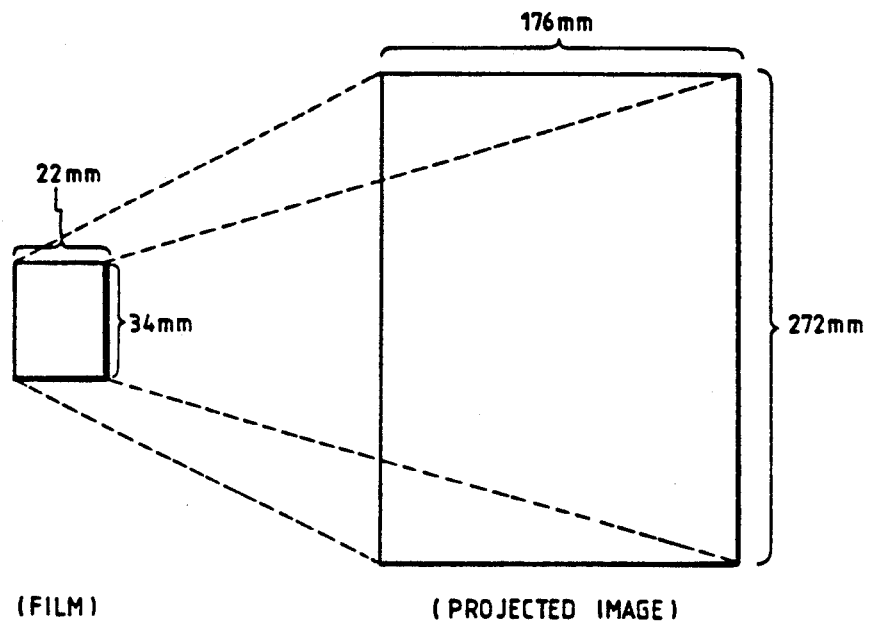
FIG. 8 illustrates a typical relation between a film and a projected image formed on the original support pane.

FIG. 8 illustrates a typical relation between the film and the projected image formed on the original support pane 17; the film image of 22×34 mm is projected on the original support pane 17 as magnified by eight times.

All function Blocks

Various function blocks of the digital color copying machine of the illustrated embodiment will now be described with reference to FIG. 9.

Each of three control units 102, 111, 121 is composed of a microcomputer, a programmable ROM, a data memory, a communication circuit, etc. and serves as a control circuit for controlling the scanner 1, the controller 2 and the printer 3. The control unit 102 is connected to the control unit 111 by a communication line and the control unit 111 is in turn connected to the control unit 121 by another communication line, so that the control units 102, 121 are operated according to the instructions from the control unit 111, using a master/-slave mode.

The control unit 111 operates according to the input instructions from the operation board 10 and the digitizer 114 when the image recording apparatus works as a color copying machine.

The operation board 10 comprises, as shown in FIG. 6, e.g., a liquid crystal display (LCD) indicator 84, and an operable-on-touch panel 85 of a transparent electrode disposed on the surface of the LCD indicator 84. Thus with the operation board 10, it is possible to make a selected instruction among an instruction regarding color, an instruction regarding editing operation, etc. Further, operation keys, which are high-frequency in use, such as a start key 87 for instructing the initiation of copying operation, a stop key 88 for instructing the termination of copying operation, a reset key 89 for returning the operation mode to a standard or reference state, and a projector key 86 for selecting a projector, are provided separately and independently.

The digitizer 114 is adapted to input necessary positional information for various processings such as trimming and masking and may be used optionally when a complex or sophisticated editing is required.

The control unit 111 also controls an ordinary parallel interface control circuit of e.g. IEEE-488, namely, GP-IB interface, and the interface control unit 112 so that the image data between external apparatuses can be inputted and outputted via this interface and so that the remote control by the external apparatuses can be performed via the interface.

The control unit 111 further controls a multivalue synthesis unit 106, an image processing unit 107, a binarization processing unit 108, a binary value synthesis unit 109 and a buffer memory 110.

The control unit 102 controls a drive unit 105 for driving and controlling the mechanism of the scanner 1, an exposure control unit 103 for controlling the exposure of a lamp when reading out the reflected image of the original, and another exposure control unit 104 for controlling the exposure of a halogen lamp 90 when using a projector. The control unit 102 also controls an analog signal processing unit 100 for various image processings and an input image processing unit 101.

The control unit 121 controls a drive unit 122 for driving and controlling the mechanism of the printer 3, and a synchronization delay memory 115 for absorbing widely varying time of operation of the mechanism of the printer 3 and for correcting any delay due to the arrangement of the mechanism of the recording heads 117–120.

The successive image processing blocks of FIG. 9 will now be described.

The image formed on the CCD 16 is converted into analog signals by the CCD 16. The converted image information is processed serially in the order of red, green and blue and is then inputted to an analog signal processing unit 100. In the analog signal processing unit 100, after sampling and holding, correcting a dark level and controlling the dynamic range for each and every color, i.e., red, green, blue, an analog-digital conversion (A/D conversion) is made so as to convert the image signals into a series multivalue (8 bits length for each color in the illustrated embodiment) and has digital image signals to output the latter to the input image processing unit 101.

In the input image processing unit 101, necessary correction processings such as CCD correction and γ correction for the read-out system are likewise made with maintaining the serial multivalue digital image signals.

A multivalue synthesis unit 106 of the controller 2 includes a circuit block for processing selection and synthesis of the serial multivalue digital image signals sent from the scanner 1 and of the serial multivalue digital image signals sent via the parallel interface (I/F). The selected and synthesized image data are sent to the image processing unit 107, with maintaining the serial multivalue digital image signals.

The image processing unit 107 is a circuit for smoothing, edge emphasizing and black extracting and also for masking processing for color correction of recording ink used in the recording heads 117–120. The serial multivalue digital image signal outputs are respectively inputted to the binarization processing unit 108 and the buffer memory 110.

The binarization processing unit 108 is a circuit for binarizing serial multivalue digital image signals and is capable of selecting either a simple binary value by a fixed slice level or a preliminary intermediate processing by a dither method. In the binarization processing unit 108, serial multivalue digital image signals are converted into four-color binary value parallel image signals; four-color image data and three-color image data are transferred to the binary value synthesis unit 109 and the buffer memory 110, respectively.

The binary value synthesis unit 109 is a circuit for selecting either a three-color binary value parallel image signal transferred from the buffer memory 110 or a four-color binary value parallel image signal transferred from the binary value processing unit 108 and for synthesizing these signals into a four-color binary value parallel image signal.

The buffer memory 110 is a memory for inputting and outputting a multivalue image and a binary value image via a parallel interface (I/F) and is capable of storing the image data for three colors.

The synchronization delay memory 115 of the printer 3 is a circuit for absorbing widely varying time of the operation of the mechanism of the printer 3 and also for correcting any delay due to the structural arrangement of the recording heads 117–120. In the interior of the synchronization delay memory 115, necessary timing to drive the recording heads 117–120 is also produced.

A head driver 116 is an analog drive circuit for driving the recording head 117–120 and for producing in the interior a signal capable of directly driving the recording heads 117–120.

The four recording heads 117, 118, 119, 120 eject cyan ink, magenta ink, yellow ink and black ink, respectively, to record an image on the recording paper.

Figure 10:
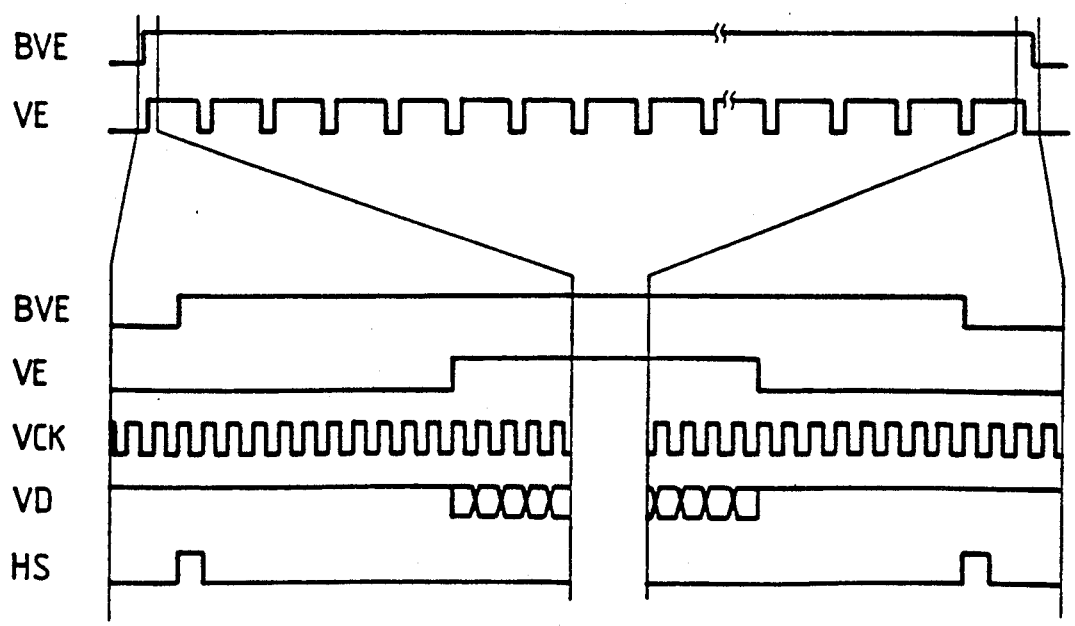
FIG. 10 illustrates an image timing between circuit blocks.

The image timing between the circuit blocks of FIG. 9 will now be described with reference to FIG. 10.

A signal BVE is a signal indicating an effective image section per scan of the main scan reading operation discussed above in connection with FIG. 5. The signal BVE is repeatedly outputted to cover the entire surface of the original.

This signal VE is a signal indicating an effective image section per scan as read out by the CCD 16. Only a signal VE when the signal BVE is effective is effective.

A signal VCK is a clock signal for delivering image data VD. The signals BVE and VE also vary in synchronism with this signal VCK.

A signal HS is a signal to be used if the signal VE repeats discrete effective and ineffective image sections while the signal VE is being outputted for a single line of scan. This signal HS is thus unnecessary if the signal VE is continuously effective while being outputted for a single line of scan; that is, the signal HS is a signal indicating the start of an image output for a single line of scan.

Figure 11:
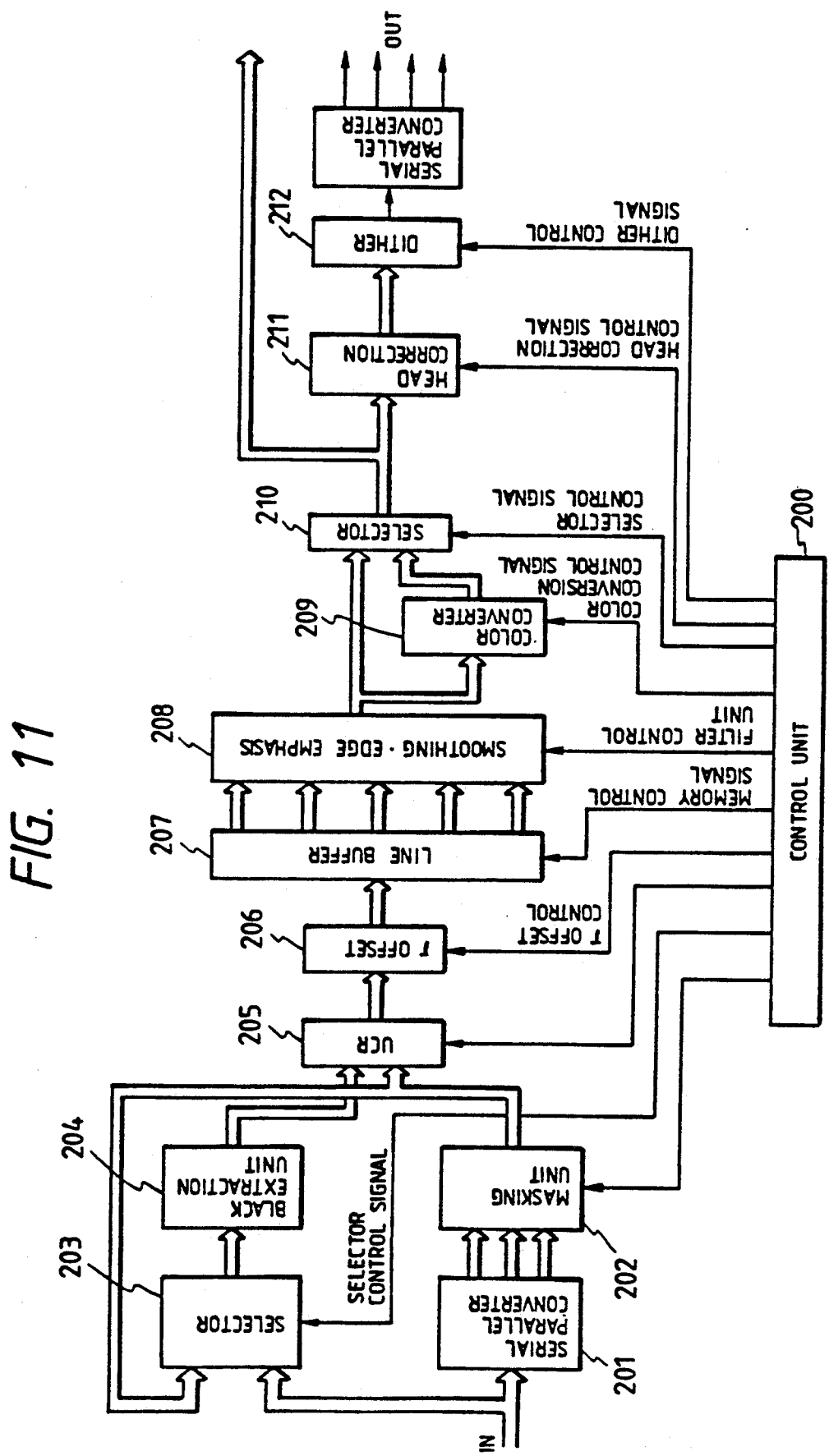
FIG. 11 is a block diagram of a color image processing apparatus.

The general signal processing in the image processing unit will now be described with reference to FIG. 11.

The image data to be serially (in a specified order) inputted (hereinafter called "input image data") to the image processing unit 107 in FIG. 9 are transferred to a serial-parallel converter 201 shown in FIG. 11 where the input image data are converted into parallel signals of yellow Y, magenta M and cyan C. Then these parallel signals are transferred to a masking unit 202 and a selector 203.

The masking unit 202 is a circuit for correcting any impurity or unclearness of color of output ink. In this masking unit 202, the following arithmetical operation is executed by using multiplication table RAMs 220–222 shown in FIG. 13.

$$\begin{bmatrix} Y' \\ M' \\ C' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y \\ M \\ C \end{bmatrix}$$

where Y, M, C stand for input data and Y', M', C' stand for output data.

These nine coefficients are determined according to masking control signals from a control unit 200. Thus in the masking unit 202 any impurity or unclearness of ink is corrected.

Figure 14:
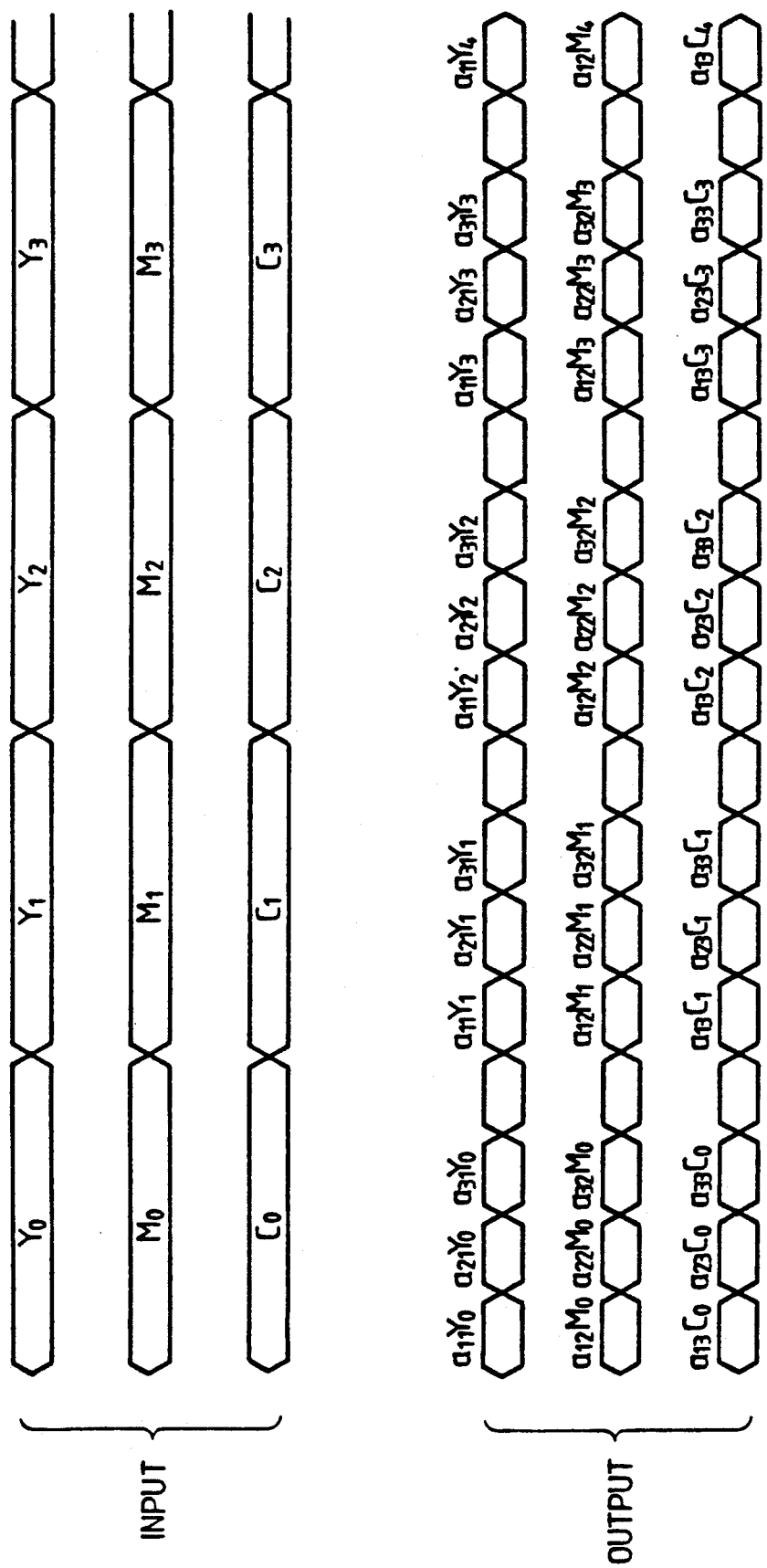
FIG. 14 is a timing chart of individual portions of the masking unit of FIG. 13.

Describing only $Y_0$ data with reference to FIG. 14, $a_{11}Y_0, a_{21}Y_0, a_{31}Y_0, 0$ are obtained respectively in this order.

Subsequently, as summing operation is made by an adder 223, the above-mentioned arithmetical operation for masking is executed to output in the order of colors.

Figure 15:
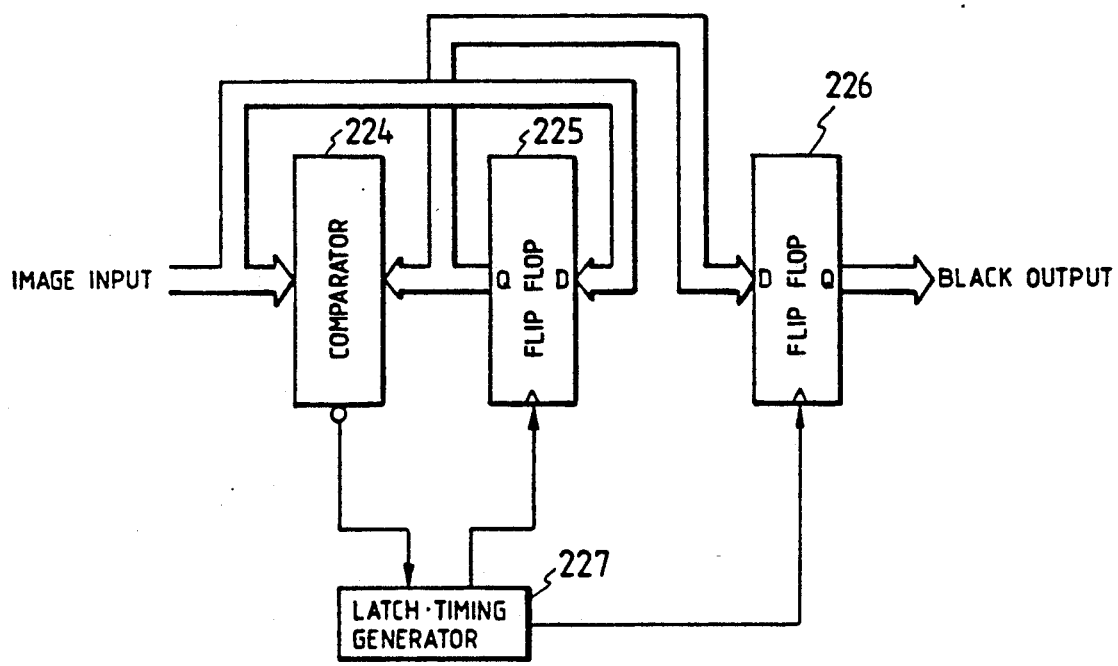
FIG. 15 is a detail circuit diagram of black extraction unit.

The black extraction unit 204 will now be described with reference to FIG. 15. The input image data are inputted in the order of Y, M, C, $\alpha$ (empty). In the case of 8 bits image data, data of $\alpha$ are corrected so as to be FFH in terms of hexagonal indication (H). The image data in the order of colors are inputted to a comparator 224 and a flip-flop 225. When the data (FFH) of $\alpha$ are inputted, the flip-flop 225 forcedly holds the data. Then the data held in the flip-flop 225 and the image input data are compared serially.

Only when the input data are larger than the data held by the flip-flop 225, a latch pulse is transferred from a latch timing generator 227 to the flip-flop 225 according to a signal from the comparator 224 to hold the input image data. When the image data for a single pixel (Y, M, C) are compared, the minimum image data of Y, M, C are held in the flip-flop 226. Thus with maintaining the image data in the order of colors, the minimum value of Y, M, C is extracted, namely, black extraction is made to output such extracted black data.

The signals processed in the masking unit 202 are inputted to the selector 203 and the UCR unit 205. To the selector 203, the input image data, and the image data outputted from the masking unit 202 are inputted.

In the selector 203, the input image data are selected normally according to a selector control signal 1 transferred from the control unit 200. If color correction in the input system is incomplete, the image data outputted from the masking unit 202 are selected and outputted according to the control signal 1. The serial image data outputted from the selector 203 are inputted to the black extraction unit 204. In order that the minimum value of Y, M, C in a single image pixel is black data, the black extraction unit 204 detects the minimum value of Y, M, C, as described above in connection with FIG. 15. The thus detected black data are inputted to the UCR unit 205.

In the UCR unit 205, the black data extracted from each signal of Y, M, C are subtracted. The black data are merely multiplied by a coefficient. After a time difference between the black data inputted to the UCR unit 205 and the image data transferred from the masking unit 202, the following arithmetical operation is executed.

$Y' = Y - a_1 Bk$ $M' = M - a_2 Bk$ $$C' = C - a_3 Bk$$

$$Bk' = a_4 Bk$$

where Y, M, C, Bk stand for input data of the extraction unit and Y', M', C', Bk' stand for output data of the extraction unit. The coefficients ($a_1$, $a_2$, $a_3$, $a_4$) are determined according to the UCR control signals transferred from the control unit 200.

Figure 16:
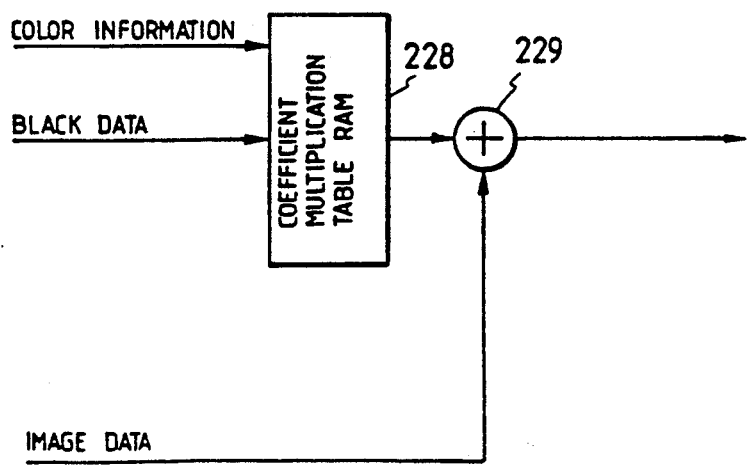
FIG. 16 is a detail circuit diagram of a UCR unit.

The UCR unit 205 will now be described with reference to FIG. 16. Black data enter a coefficient multiplication table RAM 228. Color discriminating color mode signals from the control unit 200 are also inputted to the coefficient multiplication table RAM 228. While a single image pixel of black data is being inputted, the color mode is changed to Y, M, C, Bk. According to this color information, the tables of coefficients are changed over depending on the individual colors so that the coefficient multiplication is made independently for each color. In the subtracter 229, the black data multiplication by the coefficient are subtracted from the image data transferred in the order of colors and are then outputted.

Subsequently the data outputted from the UCR unit 205 are inputted to a γ offset unit 206.

In the γ offset unit 206, the following graduation correction is made.

$$Y' = b_1(Y - C_1)$$

$$M' = b_2(M - C_2)$$

$$C' = b_3(C = C_3)$$

$$Bk' = b_4(Bk - C_4)$$

where Y, M, C, Bk stand for input data of γ offset unit, and Y', M', C', Bk' stand for output data of γ offset unit.

The coefficients ($b_1 - b_4$, $C_1 - C_4$) in the above equations are determined according to the γ offset control signals transferred from the control unit 200.

The signals graduation-corrected in the γ offset unit 206 are inputted to a line buffer 207 in which the image data corresponding to N lines may be stored. In the line buffer 207, a memory control signal transferred from the control unit 200 is smoothed, and the data of five lines necessary for the edge emphasis unit 208 are outputted in five parallel lines. The signals for five lines are inputted to a space filter with a varying filter size according to a filter control signal from the control unit 200 and are smoothed and then edge-emphasized. In this smoothing, any noise of the image is eliminated by determining the density of an objective pixel by a mean value between the objective pixel and peripheral pixels as shown in FIG. 12.

Figure 17:
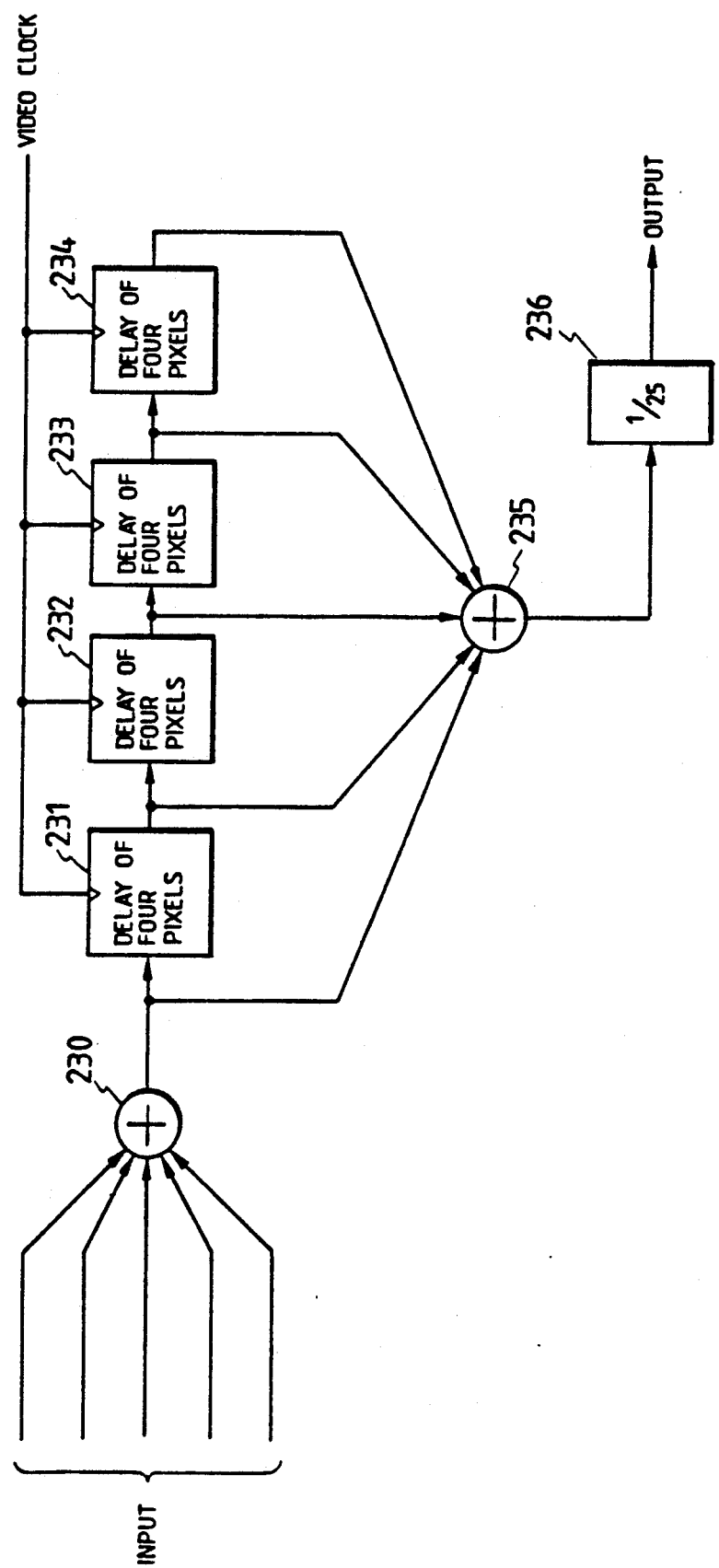
FIG. 17 is a detail circuit diagram of a smoothing unit.

The manner of smoothing will now be described with reference to FIG. 17.

The image data for each and every line are stored in the line buffer 207 in the order of colors. Since the filtering takes place in the area of 5×5 of the filter in the illustrated embodiment, the image data in the order of colors are outputted in five parallel lines. For example, the five-line data in the order of colors, which data are inputted as shown in FIG. 17, are summed by an adder 230 and are then delayed by flip-flops 231-234. The four flip-flops 231-234 are connected in series so as to make a delay by four pixels. With this arrangement, even if the image data are inputted in the order of colors, filtering can take place for each color. Although the filter matrix is 5×5 in the illustrated embodiment, the size of the filter should not be limited to this illustrated example according to the present invention. The thus delayed image data are inputted to the adder 235 and are summed therein, whereupon the image data are table-converted into 1/25 by a subtracter RAM 236 and are outputted therefrom. An edge signal, as defined by the difference between the objective pixel data and the smoothed signal, is added to the objective pixel data to cause an edge emphasis.

The image data outputted from the smoothing/edge emphasis unit 208 is inputted to a color converter 209 and is color-converted according to a color-conversion control signal from the control unit 200. In a digitizer 114 of FIG. 9, the color to convert, the color to be converted, and the region in which the signal is effective, are inputted in advance, whereupon the image data are converted by the color conversion unit 209 according to such inputted data. In the illustrated embodiment, the detailed description of the color conversion unit 209 is omitted for clarity. The image signal outputted from the smoothing/edge emphasis unit 208 and the color-converted image signal are inputted to a selector 210 where the image data to be outputted are selected according to a selector control signal 2. The image data to be selected is determined by designating an effective region inputted by the digitizer 114. The image signals selected by the selector 210 is inputted to the buffer memory 110 and the binarization processing unit 108, as shown in FIG. 9.

The description of the system to be inputted to the buffer memory 110 is omitted here for clarity.

The binarization processing unit 108 will now be described. The image data to be inputted to the binarization processing unit 108 is inputted to a head correction unit 211 (described below) of FIG. 11. The image signal density-corrected by the head correction unit 211 is then inputted to the dither unit 212 by serial 8-bits in the order of Y, M, C, Bk.

The dither unit 212 has a capacity such that six bits in the main scanning direction and six bits in the sub-scanning direction, or four bits in the main scanning direction and eight bits in the sub-scanning direction, may be stored for each color. Accordingly the dither matrix size and the dither threshold value in the dither matrix are determined according to dither control signals from the control unit 200. While the dither circuit is operative, the image region signals of the line CCD1 in the mechanical main scanning direction, and the image video clock signals in the sub-scanning direction are respectively counted to read out the dither threshold set on the memory space. Further, this memory space is changed over with Y, M, C, Bk serially to obtain a serial dither threshold. Then, this threshold is inputted to a comparator where the threshold is compared with the image data inputted from the selector 210.

The output of the comparator is:
Image data > Threshold: 1
Image data ≦ Threshold: 0.

Figure 18:
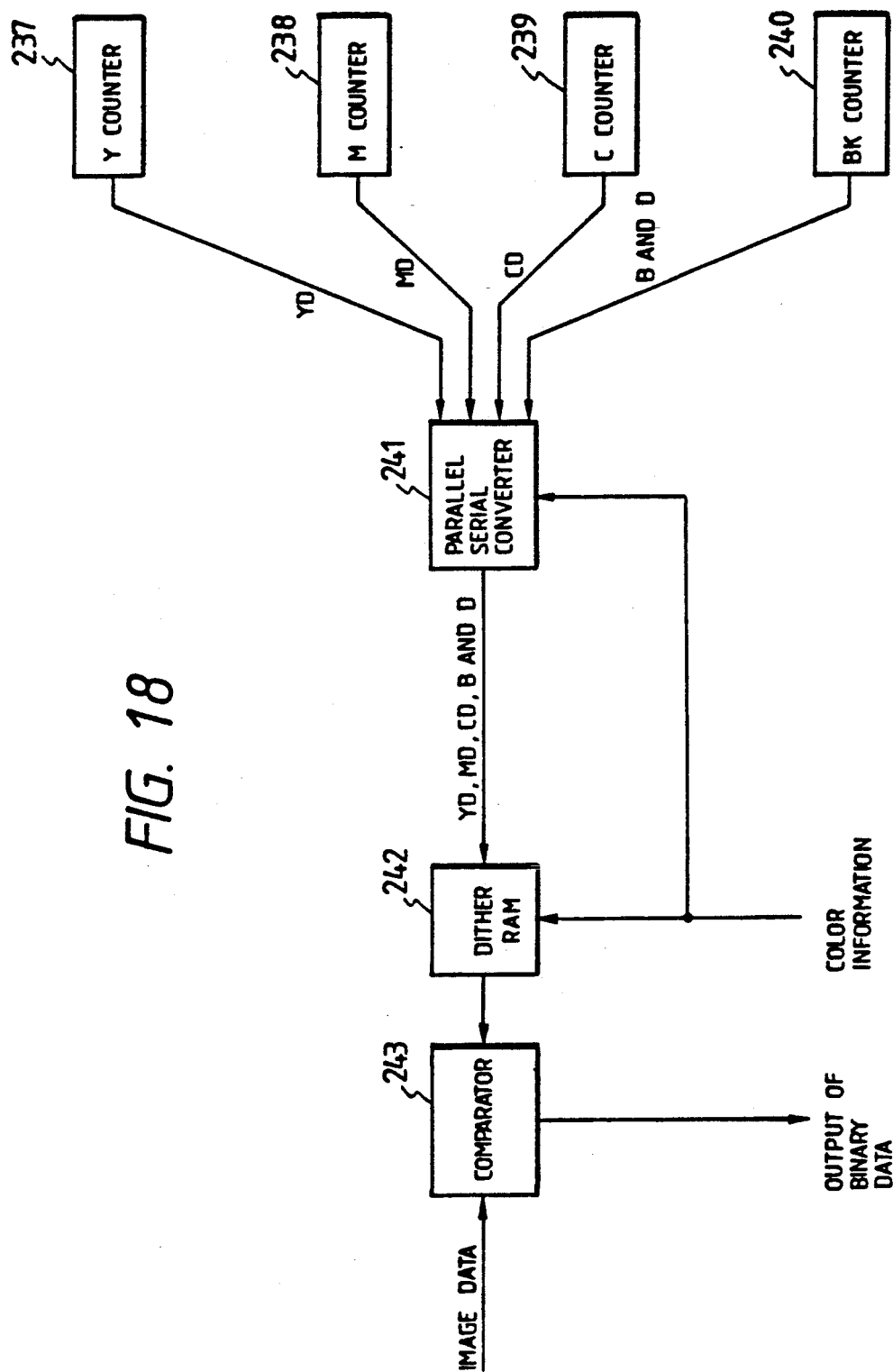
FIG. 18 is a detail circuit diagram of a dither processing unit.

The dither will be described with reference to FIG. 18. The dither has a counter 237-240 for each color so as to be changeable. The four-color counter values (YD, MD, CD, BKD) are outputted by a parallel-serial converter 241 to a dither RAM 242 in the order of YD, MD, CD, BkD. In the dither RAM 242, the higher address is changed over with the color information to vary the dither threshold independently for each color. Thus the dither threshold outputted from the dither RAM 242 in the order of colors is inputted to a comparator 243. In the comparator 243, the image data transferred thereto in the order of colors and the dither threshold in the order of colors are compared and binarized and are then converted by the serial-parallel conversion unit 212 to output a signal of the total four bits, one bit for each of Y, M, C, Bk.

The binarized data are outputted, as the parallel four-bit data, by the serial-parallel conversion unit to the buffer memory 110 of FIG. 9 and the binary value synthesis unit 109.

Figure 19:
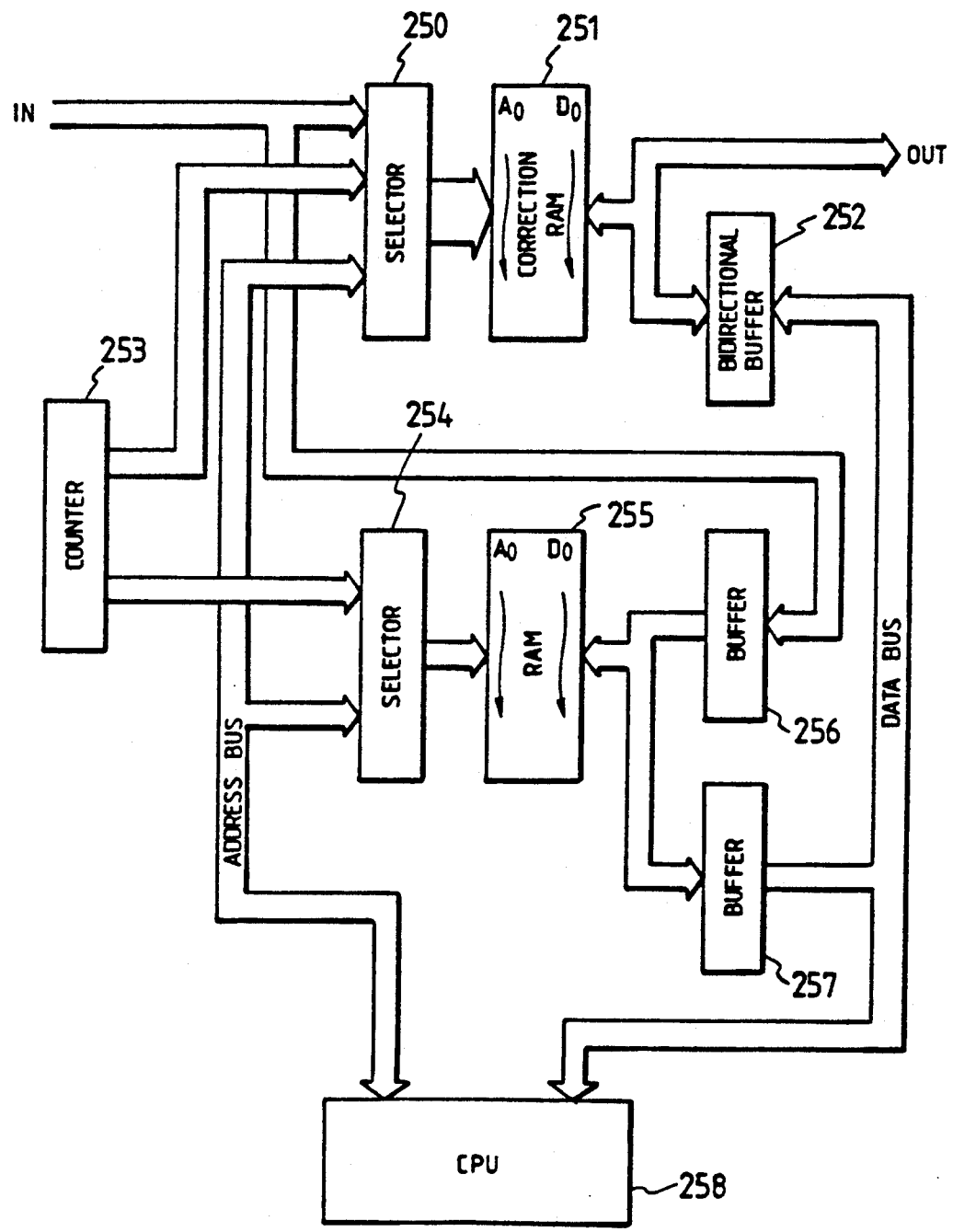
FIG. 19 is a detail circuit diagram of a head correction unit.

The head correction unit 211 will now be described with reference to FIG. 19. For preparation, a full-ejection all-over pattern is outputted by the printer, and the scanner reads out this pattern to obtain image data. Since the all-over pattern shows a different recording characteristic for each element of the individual head, the image data of the all-over pattern are written in a RAM 255 via a buffer 256 for each element. Further, a counter 253 produces an address according to the image data to the RAM 255 via the selector 254. Thus the image data of non-uniform density stored in the RAM 255 are addressed via the selector 254, and the addressed data are read out by a CPU 258 via a buffer 257. Based on the read-out image data, the CPU 258 executes the coefficient arithmetical operation so as to correct the non-uniform density. In the illustrated embodiment, a correction coefficient for each element is obtained from the following equation.

$$ai = \frac{FF_H}{Di}$$

where $ai$ stands for correction coefficient and $Di$ stands for density data of read-out image pixels of the all-over pattern.

Assuming that the actually inputted pixel data are $Dti$, an arithmetical operation of $Dti \times ai$ is executed to obtain the output pixel data. Alternatively, any other arithmetical operation may be executed to make a correction.

The thus obtained coefficient is written in an address corresponding to each recording element of the correction RAM 251 via a selector 250 and a bidirectional buffer 252. For ordinary image read-out, the signals of the counter 253 are selected by the selector 250 and are inputted at the address of the correction RAM 251. The input image data are allotted to the lower eight bits, the address data corresponding to each recording element of the head from the counter 253 are allotted to the higher eight bits. As both the image data and the corresponding address data from the counter 253 are inputted to the correction RAM 251, the corrected image data corresponding to the characteristic for each recording element of the head can be obtained as the output of the correction RAM 251. This output is inputted to the dither unit 211 and is binarized and outputted. Both the characteristic data of each recording element and the correction coefficient data are memorized with respect to the heads for all of Y, M, C, Bk.

Although RAM is used to make a correction in the illustrated embodiment, the prechecked characteristic of the multi-nozzle heads may be written such as in a ROM. Further, of the prechecked characteristic of the heads, only the correction coefficient may be written in ROM, RAM, etc.

The recording heads are not limited to the illustrated ink-jet heads, but they may be any other type such as thermal heads.

According to the above-mentioned embodiment, since any widely varying output density of the multi-nozzle heads due to the non-stable characteristic of the manufacturing process and of the material of the heads are electrically corrected, it is possible to obtain a high-quality and inexpensive image recording apparatus.

Figure 20:
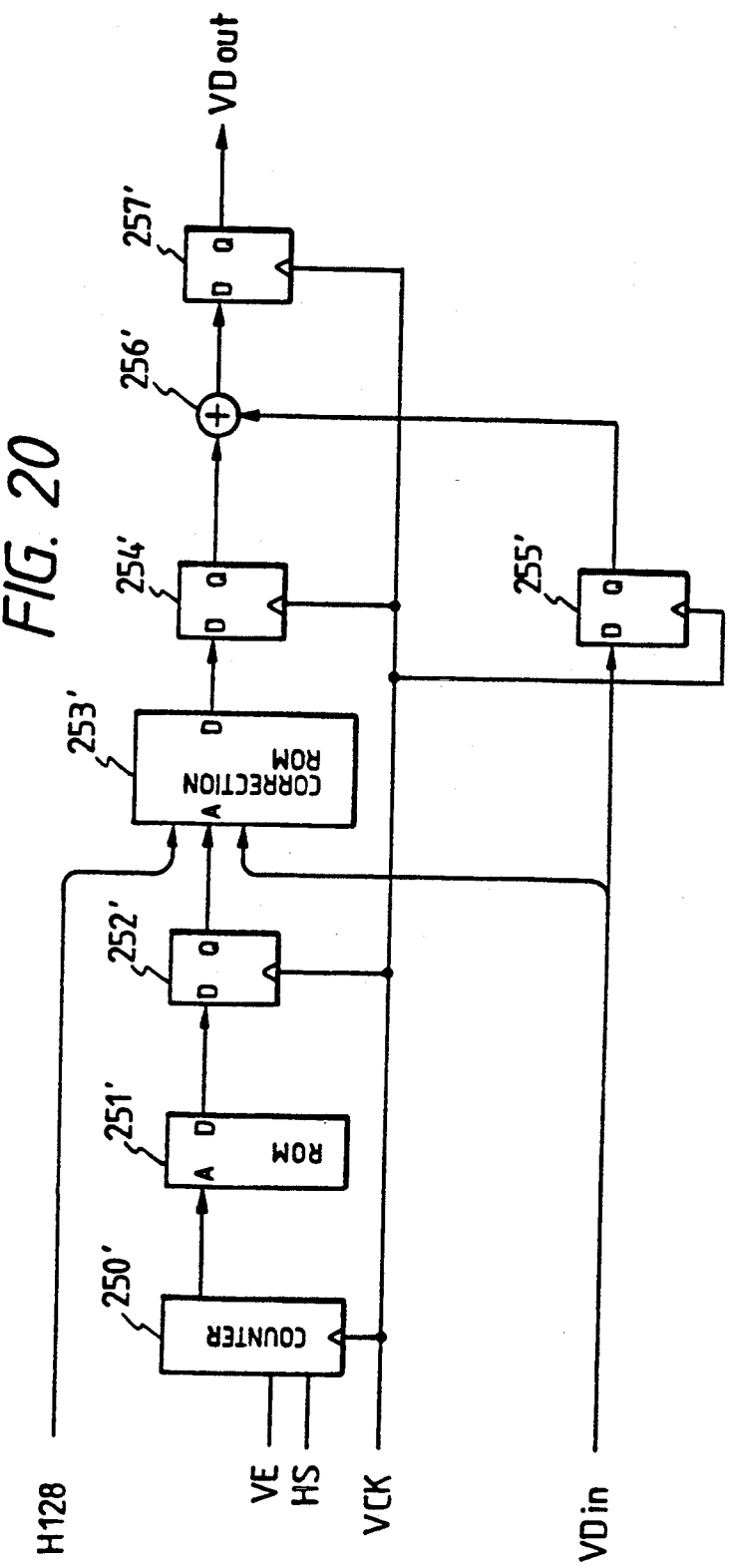
FIG. 20 is a detail circuit diagram of a modified head correction unit.

FIG. 20 illustrates a modified head correction unit 211 according to a second embodiment. In the second embodiment, all of 256 nozzles of the recording head 37 are used for both the magnified and equimultipled recording. In the reduced, e.g. ½ recording, however, the data read out by the CCD 16 are multiplied by a reducing rate of ½ to control the head so that the number of effective pixels is reduced to half, namely, 128. Thus, the magnified or equimultipled recording is performed using all 256 nozzles of the head, while the reduced recording is performed using only a half the total number of nozzles of the head, i.e. 128.

FIG. 20 is a block diagram of the modified head correction unit 211. A counter 250' is an address counter for producing an address of an extent-of-correction selection table ROM (hereinafter called "selection ROM") 251'. The counter 250' is a ten bits counter for counting at least 1024 nozzles of total four heads, each having 256 nozzles and is controlled by the signals HS, VE. In the selection ROM 251', a selected value of the correction amount of each nozzle of the head for each color is written in the order of colors. A signal H128 is a one-bit signal indicative of the number of the used nozzles of the head; the signal is 0 in the case of the magnified and equimultipled recording, and it is 1 in the case of the reduced recording. The signal H128 is inputted at the address of correction ROM 253', together with the output of the correction ROM 251' and the input picture signal VDin. In the correction ROM 253', a correction curve is written to indicate as to which nozzle's data should be corrected and as to the extent to which such nozzle's data should be corrected depending on the density value. Accordingly, commensurate with the level of H128 to be inputted, a correction value corresponding to each density value of the individual nozzle for each case of magnified, equimultipled and reduced recording, is outputted. The correction value outputted from the correction ROM 253' is inputted in the adder 256' via a flip-flop 254'. The picture signal VDin is also inputted in an adder 256' via a flip-flop 255', and is synchronized by a flip-flop 257' and is outputted from the head correction unit 211' as VDout. This output is inputted to the dither unit 212', is binarized, and is recorded by the recording heads 37.

Figure 21:
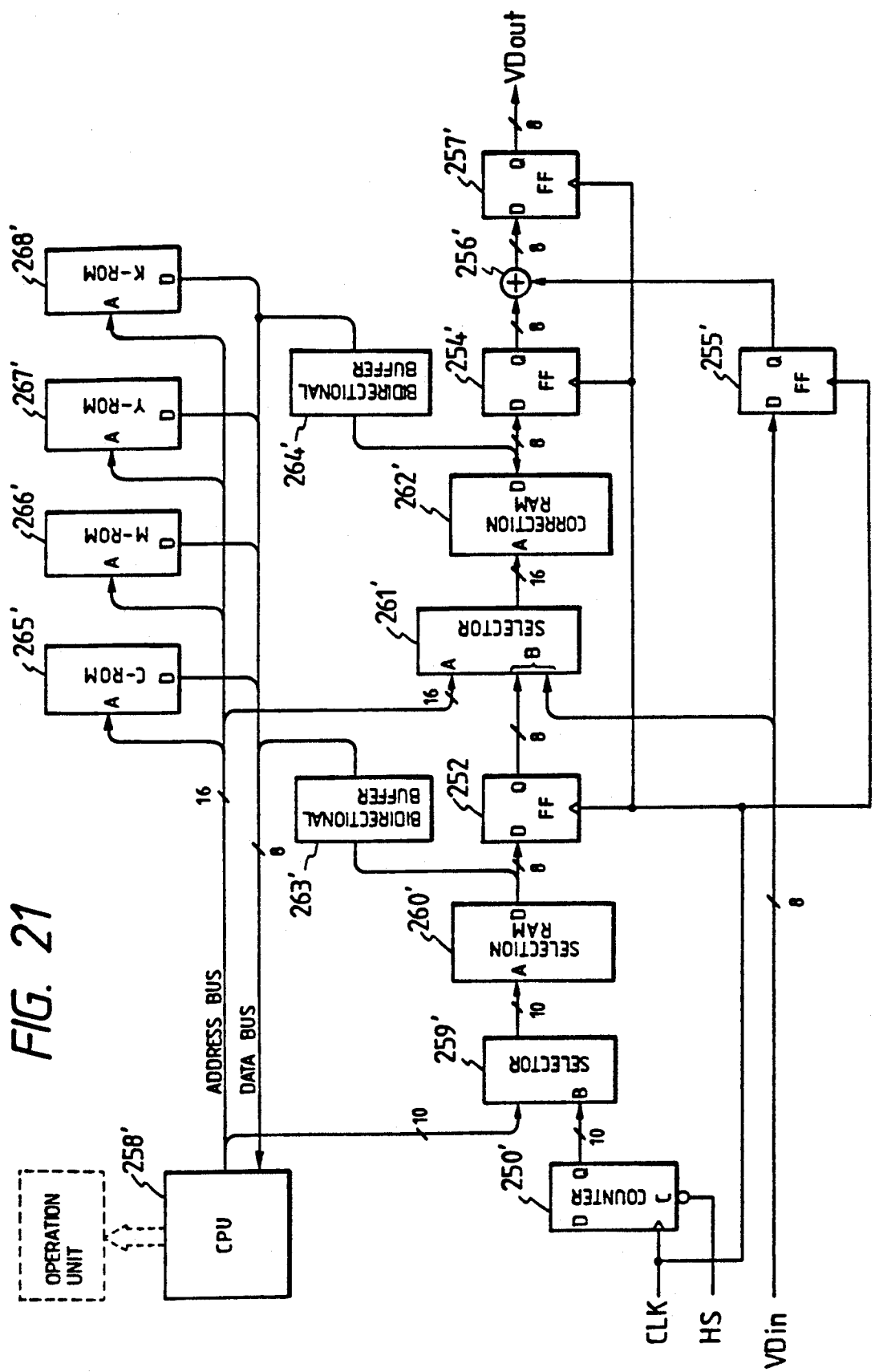
FIG. 21 is a detail circuit diagram of another modified head correction unit.

FIG. 21 illustrates a third embodiment partly similar to the embodiment of FIG. 20. Therefore, in FIGS. 20 and 21, like reference numerals designate similar parts having similar functions. The description of such similar parts in connection with FIG. 21 is omitted here for clarity. The method of changing the recording size in this embodiment is similar to that of the first embodiment, and its detailed description is also omitted here for clarity.

In FIG. 21, ROMs 265'-268' are characteristic ROMs in which characteristic information concerning non-uniform density of 256 nozzles of the individual head for each color C, M, Y, Bk is written. In the embodiment of FIG. 21, as each head has 256 nozzles, data for correcting non-uniform density of the heads corresponding to the number of the nozzles are written in the respective ROM 265'-268'. The digital image data are inputted such that color component image data for each pixel is inputted in the order of Y, M, C, K, Y, M, C, K. In the selection RAM 260', the data taken from the ROMs 265'-268' are stored to meet the order of the inputted image data. Designated by 268' is a bidirectional buffer for writing in the RAM 260' the data taken from the ROMs 265'-268'.

Figure 22:
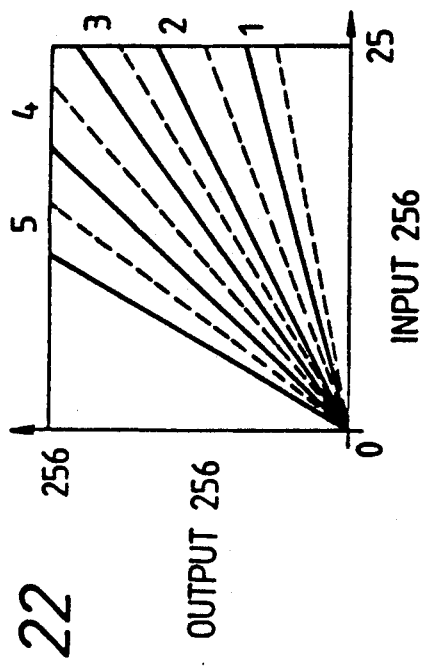
FIG. 22 illustrates a correction table to be written in a correction RAM of FIG. 21.

259' designates a selector for selecting the lower ten bits among the addresses of 16-bit address bus outputted from the CPU 258' or the output of ten bits of the counter 250'. To write the data in the RAM 260', the selector 259' selects the output of the CPU 258'; to read out the data from the RAM 260', the selector 259' selects the output of the counter 250'. 262' designates a correction RAM in which the data from the CPU 258' may be written. The selector 261' selects 16-bit address from the CPU 258' or the total 16 bits of the output from an eight-bit flip-flop 252' and eight bits of image data input VDin, and inputs it in the correction RAM 262'. In the correction RAM, the correction tables as indicated in solid lines or dotted lines in FIG. 22 are written from the CPU 258'. In FIG. 22 five correction tables indicated in dotted lines are shown, but in practice there are more correction tables. The correction tables of solid lines or dotted lines 1-5 are selected according to the data inputted in the correction RAM 262'. In other words, if the selector 261' selects the B side, the eight-bit image data input VDin and the eight-bit non-uniform density correction data are inputted in the RAM 262'; eight-bit non-uniform density correction data are used to select the solid lines or dotted lines 1-5. The solid lines indicate the data for the equimultipled recording, and the dotted lines indicate the data for the magnified or reduced recording. Depending upon the area of the operative nozzles (of the head) in use, either the data of dotted lines or the data of solid lines are written in the correction RAM 262' by the CPU 258'.

The tables are written in the correction RAM 262' so as to output the correction data $\Delta A$ in respect to the input A. This correction data $\Delta A$ is once latched by the flip-flop 254' and is then summed with the input image data A by the adder 256' and is outputted as the corrected data $A + \Delta A$ via a flip-flop 257'.

The correction tables shown in FIG. 22 may be curved lines rather than straight lines.

In the third embodiment, a cubical function is used as a preferred example of the curve, and the amount of correction of non-uniform density is within the range of approximately ±15%. Accordingly VDout may be expressed in the following equation so as to satisfy the following values.

$$VDout = aD^3in + bD^2in + cDin + d$$

$$a = \begin{cases} 2.24 \times 10^{-6} \times N(N < 0) \\ -2.04 \times 10^{-6} \times N(N \geq 0) \end{cases}$$

$$b = \begin{cases} -3.33 \times 10^{-4} \times N(N < 0) \\ 2.37 \times 10^{-4} \times N(N \geq 0) \end{cases}$$

$$c = \begin{cases} 1 + 0.006 \times N(N < 0) \\ 1 - 0.0005 \times N(N \geq 0) \end{cases}$$

$$d = 0$$

where Din, Dout and N stand for input density, output density and amount of correction, respectively.

The mode of correcting operation of the embodiment of FIG. 21 will now be described.

The power source of the apparatus is turned on, and before a copying start key is depressed, the selectors 259', 261' respectively select the input at the A side. Thereby, in the selection RAM 260, the data from the ROMs 265'-268' are written in the order of Y, M, C, K of the input image data VDin. Also before the copy start key is depressed, the correction tables of the dotted lines or solid lines of FIG. 22 are written in the correction RAM 262' according to the preset rate of magnification or reduction.

Then, as the copying start key is depressed to start copying, the output of the CPU 258' is inputted to the selectors 259', 261' at the B side, namely, the image control side.

When the picture signal VDin inputted from the CCD is inputted in the head correction 211, the address outputted by the counter 250 is inputted in the address of the selection RAM 260' via the selector 259' so that the selection data for the individual color is inputted in the selector 261' via the flip-flop 252'. In the selector 261', the eight-bit input picture signal VDin is inputted as low level, and the output of eight bits of the selection RAM 260' is inputted as high level, both being inputted in the address A of the correction RAM 262'. Subsequently, the correction value commensurate with the above equation is inputted in the adder 256' via the flip-flop 254'. The picture signal VDin also inputted in the adder 256' via the flip-flop 255' and is summed with the correction value to realize the above-mentioned equation. To this end, the picture signal is outputted as VDout from the head correction unit 211' via the flip-flop 257'. This output is inputted in the dither unit 212', is binarized and is recorded by the recording heads 37.

In the embodiment of FIG. 21, the correction ROMs 265'-268' are provided one for each head Y, M, C, K. Even when any one of the heads Y, M, C, K was replaced with new one, it is convenient that a ROM corresponding to the replaced head be merely replaced, unlike the embodiment of FIG. 19. Partly because the selection RAM 260' and the correction RAM 262' are provided independently of each other, and partly because the correction RAM 262' is rewritten according to the area of the operative nozzles, it is possible to change the rate of magnification or reduction simply by rewriting the correction RAM 262'.

According to the embodiments of FIGS. 20 and 21, partly because non-uniform output density of the individual head is electrically corrected, and partly because the input image data can be corrected according to the information determining the area of the operative nozzles, it is possible to obtain an excellent image with uniform density, irrespective of the effective area of the nozzles.

Further, with the circuit of the embodiments of FIGS. 20 and 21, since non-uniform density can be corrected in the order of colors without any additional circuit, a high-quality and inexpensive image recording apparatus can be guaranteed.

In these illustrated embodiments, the present invention is applied to an apparatus in which the area of the operative nozzles is varied according to the rate of magnification or reduction. The present invention may also be applicable to any other apparatus in which a multiplicity of nozzles can be selectively operative in a desired pattern of areas.

Although only the ink-jet recording method is used in the illustrated embodiments, the recording head may be any other multi-nozzle heads or even any other type such as a heat transfer recording method.

According to the present invention, since the correcting characteristic of the correcting means is varied according to the operative areas of the multi-nozzle heads, it is possible to obtain an excellent quality image with uniform density.

Figure 23:
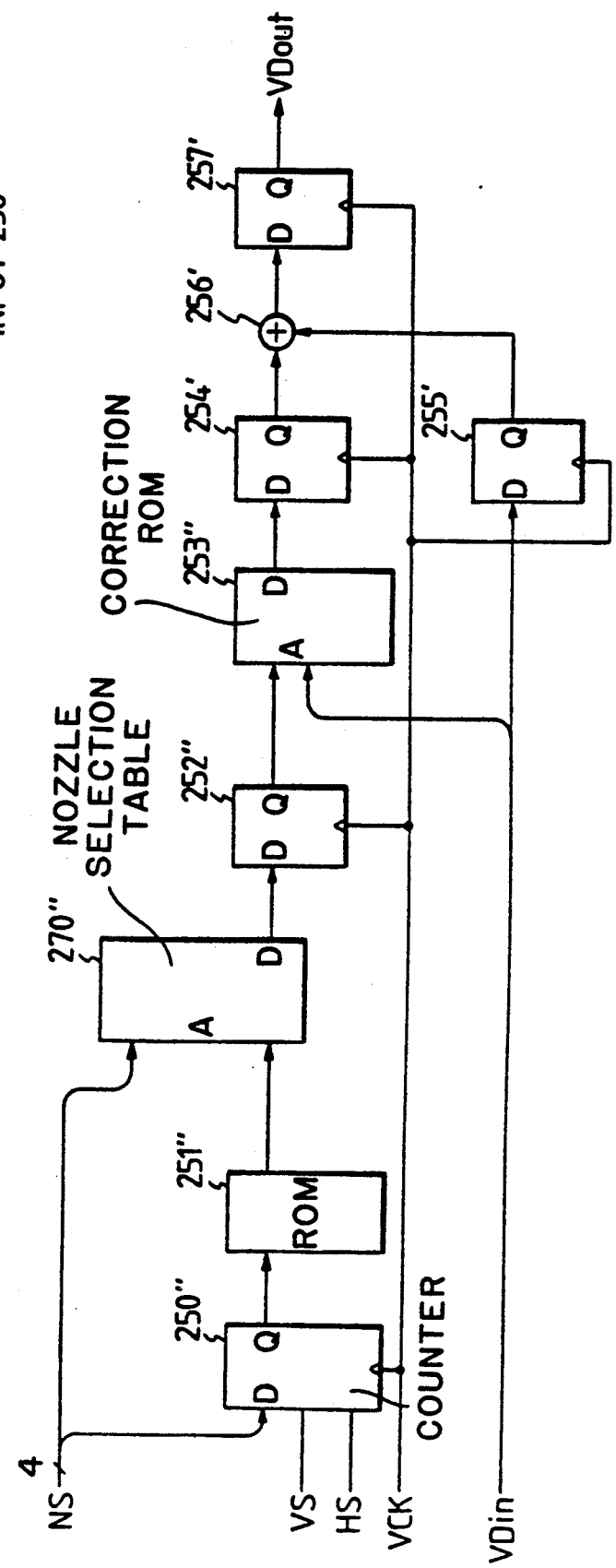
FIG. 23 is a detail circuit diagram of still another modified head correction unit.

FIG. 23 illustrates still another modification of the head correction unit 211 of FIG. 20. In this embodiment, since each recording head 37 has 256 nozzles, recording can be made on the recording paper progressively by a unit of 256-nozzle (about 16 mm). Therefore, when recording on the final or bottom line, it is necessary to make a record less than 16 mm and, for this purpose, the number of nozzles to be used is regulated by a unit of 1 mm. With a four-bit signal NS regulating the number of nozzles being used, it is possible to give a preset value for the number of nozzles.

In a selection ROM 251", a selected value of the correction for the individual nozzles of the heads is written in the order of colors, namely, C, M, Y, Bk. The signal NS is inputted in the nozzle selection table ROM 270" (hereinafter called "nozzle selection ROM") together with the selection ROM 251". The nozzle selection ROM 270" is a table ROM for controlling the amount of correction according to the area of nozzles, and in the illustrated embodiment, adjustment is possible in a unit of 1 mm from the upper end of the recording paper. In the nozzle selection ROM 270", data for reselecting the correction curve by the selection ROM 251" according to the effective area of the nozzles, are written. The output of the nozzle selection ROM 270" is inputted to the address of the correction ROM 253" via the flip-flop 252". In the correction ROM 253", a correction curve is written indicative as to which nozzles should be corrected and as to what degrees the density should be corrected. The selection ROM 251a" and the nozzle selection ROM 270" jointly corrects the density value for each color.

As indicated by dotted lines in FIG. 21, the CPU 258' can make a discrimination as to the paper size preset by the operation board 10 so that before the copying start key is depressed, a correction table of dotted lines or solid lines in FIG. 22 is written in the correction RAM 262' according to the paper size preset by the operation board 10.

As the copying start key is depressed, the copying operation as discussed in FIG. 21 is initiated.

Particularly in the present embodiment, while the printer carriage 34 is returned upon completion of recording of a single line, the CPU 258' with the selectors 259', 261' discriminates the number of nozzles to be used in the next recording scan and rewrites the correction data of the correction RAM 262'. This is, if the recording of the next scan uses all the 256 nozzles, the CPU 258' discriminates the correction data of solid lines of FIG. 3 for each and every scan to write the result of the discrimination in the correction RAM. If the next scan is the last line, the CPU 258' discriminates the correction data of dotted lines to write the result of the discrimination in the correction RAM.

In the foregoing embodiments, the heads each having 256 nozzles are used. Alternatively, for example, a full-multi-head having a nozzle of a width equal to the effective printing width of a recording paper may be used. For example, if the head has a nozzle of a length (297 mm) corresponding to the effective printing width of an A4-size recording paper, the present invention can be applied to the illustrated embodiments because the number of the nozzles varies for a recording paper smaller than A4 size.

Further, in some input images for a single head, there are portions where constant density data are printed and portions where nothing is printed, even in which event it is possible to prevent non-uniform printing by making an alternative selection on the correction curve, thus causing a high-quality image.

Although various minor modifications may be suggested by those versed in the art, it should be understood that we wish to embody within the scope of the patent granted hereon, all such embodiments as reasonably and properly come within the scope of our contribution to the art.

What is claimed is:

1. An image recording device comprising:
    a plurality of recording elements for forming an image in accordance with an input half-tone image signal, wherein said plurality of recording elements record in a same color; and
    a plurality of γ-converting means for γ-converting the input image signal, wherein said plurality of γ-converting means are provided correspondingly to said plurality of recording elements which record in the same color.

2. An image recording device according to claim 1, wherein said γ-converting means include a look up table.

3. An image recording device according to claim 1, wherein each of said plurality of recording elements comprises an ink jet recording element.

4. An image recording device according to claim 1, further comprising means for generating the input image signal.

5. An image recording device according to claim 4, wherein said generating means includes a scanner for converting an original image into the input image signal.

6. An image recording device according to claim 3, wherein said ink jet recording elements eject liquid drops by film-boiling due to heat energy.

7. An image recording apparatus comprising:
    a plurality of recording elements for forming a half-tone image in accordance with an input half-tone image signal, said plurality of recording elements for recording in a same color;
    a plurality of γ-converting means for γ-converting the input half-tone image signal, wherein said plurality of γ-converting means are provided correspondingly to each of said plurality of recording elements; and
    means for half-tone processing the input half-tone image signal γ-converted by said plurality of γ-converting means and for outputting a signal for driving said plurality of recording elements.

8. An image recording apparatus according to claim 7, wherein said γ-converting means include a look up table.

9. An image recording apparatus according to claim 7, wherein each of said plurality of recording elements comprises an ink jet recording element.

10. An image recording apparatus according to claim 7, further comprising means for generating the input image signal.

11. An image recording apparatus according to claim 10, wherein said generating means includes a scanner for converting an original image into the input image signal.

12. An image recording apparatus according to claim 9, wherein said ink jet recording elements eject liquid drops by film-boiling due to heat energy.

13. An image recording apparatus according to claim 7, wherein said half-tone processing means includes binarizing means for binarizing said half-tone image signal γ-converted by said plurality of γ-converting means.

* * * * *

UNITED STATES PATENT AND TRADEMARK OFFICE
CERTIFICATE OF CORRECTION

PATENT NO. : 5,283,657   Page 1 of 2
DATED : February 1, 1994
INVENTOR(S) : Hiroyuki ICHIKAWA, et al.

It is certified that error appears in the above-indentified patent and that said Letters Patent is hereby corrected as shown below:

AT [56] REFERENCES CITED - FOREIGN PATENT DOCUMENTS:

"54473  3/1982  Japan ." (second occurrence) should be deleted.

COLUMN 2:

Line 59, "composed" should read --composed of--.

COLUMN 5:

Line 10, "an" should read --a--.

COLUMN 8:

Line 54, ""with" should read --while--.

COLUMN 10:

Line 15, "are obtained" should read --are serially obtained as the multiplication table RAMs 220-222 are changed over four times according to the color information during a single cycle of the y image data being inputted. Likewise, for M and C, $a_{12}M_0$, $a_{32}M_0$, 0 and $a_{13}C_0$, $a_{23}C_0$, 0 --.

UNITED STATES PATENT AND TRADEMARK OFFICE
CERTIFICATE OF CORRECTION

PATENT NO. : 5,283,657
DATED : February 1, 1994
INVENTOR(S) : Hiroyuki ICHIKAWA, et al.

It is certified that error appears in the above-indentified patent and that said Letters Patent is hereby corrected as shown below:

COLUMN 12:

Line 27, "is" should read --are--.

COLUMN 18:

Line 13, "even" should be deleted;
Line 36, "look up" should read --look-up--;
Line 67, "look up" should read --look-up--.

Signed and Sealed this

Eleventh Day of October, 1994

Attest:

BRUCE LEHMAN

Attesting Officer　　Commissioner of Patents and Trademarks